US010099276B2

United States Patent
Moricca et al.

(10) Patent No.: US 10,099,276 B2
(45) Date of Patent: Oct. 16, 2018

(54) METHOD AND ASSEMBLY FOR FORMING COMPONENTS HAVING AN INTERNAL PASSAGE DEFINED THEREIN

(71) Applicant: General Electric Company, Schenectady, NY (US)

(72) Inventors: Timothy Michael Moricca, Simpsonville, SC (US); Stephen Francis Rutkowski, Duanesburg, NY (US); Joseph Leonard Moroso, Greenville, SC (US); Fred Thomas Willett, Jr., Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 264 days.

(21) Appl. No.: 14/972,390

(22) Filed: Dec. 17, 2015

(65) Prior Publication Data
US 2017/0173669 A1 Jun. 22, 2017

(51) Int. Cl.
*B22C 9/10* (2006.01)
*B22C 9/24* (2006.01)
(Continued)

(52) U.S. Cl.
CPC ............... *B22C 9/10* (2013.01); *B22C 9/04* (2013.01); *B22C 9/108* (2013.01); *B22C 9/24* (2013.01);
(Continued)

(58) Field of Classification Search
CPC .. B22C 3/00; B22C 9/10; B22C 9/106; B22C 9/108; B22C 9/24; B22D 19/0072; B22D 25/02; B22D 29/002
(Continued)

(56) References Cited

U.S. PATENT DOCUMENTS 2,687,278 A 8/1954 Smith et al.
2,756,475 A 7/1956 Hanink et al.
(Continued)

FOREIGN PATENT DOCUMENTS

CH 640440 A5 1/1984
EP 0025481 A1 3/1981
(Continued)

OTHER PUBLICATIONS

Ziegelheim, J. et al., "Diffusion bondability of similar/dissimilar light metal sheets," Journal of Materials Processing Technology 186.1 (May 2007): 87-93.
(Continued)

*Primary Examiner* — Kevin P Kerns
(74) *Attorney, Agent, or Firm* — Armstrong Teasdale LLP

(57) ABSTRACT

A method of forming a component having an internal passage defined therein includes positioning a jacketed core with respect to a mold. The jacketed core includes a hollow structure that includes an interior portion shaped to define at least one interior passage feature of the internal passage. The jacketed core also includes an inner core disposed within the hollow structure and complementarily shaped by the interior portion of the hollow structure. The method also includes introducing a component material in a molten state into a cavity of the mold to form the component, such that the inner core defines the internal passage including the at least one interior passage feature defined therein.

15 Claims, 10 Drawing Sheets

(51) Int. Cl.

| | | |
|---|---|---|
| *B22D 19/00* | (2006.01) | |
| *B22D 29/00* | (2006.01) | |
| *B22C 9/04* | (2006.01) | |
| *B22C 21/14* | (2006.01) | |
| *B22D 19/16* | (2006.01) | |
| *F01D 5/18* | (2006.01) | |
| *B33Y 80/00* | (2015.01) | |
| *B33Y 10/00* | (2015.01) | |

(52) U.S. Cl.
CPC .......... *B22C 21/14* (2013.01); *B22D 19/0072* (2013.01); *B22D 19/16* (2013.01); *B33Y 80/00* (2014.12); *F01D 5/187* (2013.01); *B33Y 10/00* (2014.12); *F05D 2230/211* (2013.01); *F05D 2240/127* (2013.01); *F05D 2260/22141* (2013.01)

(58) Field of Classification Search
USPC ......... 164/24, 28, 33, 35, 91, 132, 365, 366, 164/367, 369
See application file for complete search history.

(56) References Cited

U.S. PATENT DOCUMENTS

| | | |
|---|---|---|
| 2,991,520 A | 7/1961 | Dalton |
| 3,160,931 A | 12/1964 | Leach |
| 3,222,435 A | 12/1965 | Mellen, Jr. et al. |
| 3,222,737 A | 12/1965 | Reuter |
| 3,475,375 A | 10/1969 | Yates |
| 3,563,711 A | 2/1971 | Hammond et al. |
| 3,596,703 A | 8/1971 | Bishop et al. |
| 3,597,248 A | 8/1971 | Yates |
| 3,662,816 A | 5/1972 | Bishop et al. |
| 3,678,987 A | 7/1972 | Kydd |
| 3,689,986 A | 9/1972 | Takahashi et al. |
| 3,694,264 A | 9/1972 | Weinland et al. |
| 3,773,506 A | 11/1973 | Larker et al. |
| 3,824,113 A | 7/1974 | Loxley et al. |
| 3,844,727 A | 10/1974 | Copley et al. |
| 3,863,701 A | 2/1975 | Niimi et al. |
| 3,866,448 A | 2/1975 | Dennis et al. |
| 3,921,271 A | 11/1975 | Dennis et al. |
| 3,996,048 A | 12/1976 | Fiedler |
| 4,096,296 A | 6/1978 | Galmiche et al. |
| 4,130,157 A | 12/1978 | Miller et al. |
| 4,148,352 A | 4/1979 | Sensui et al. |
| 4,236,568 A | 12/1980 | Larson |
| 4,285,634 A | 8/1981 | Rossman et al. |
| 4,352,390 A | 10/1982 | Larson |
| 4,372,404 A | 2/1983 | Drake |
| 4,375,233 A | 3/1983 | Rossmann et al. |
| 4,417,381 A | 11/1983 | Higginbotham |
| 4,432,798 A | 2/1984 | Helferich et al. |
| 4,557,691 A | 12/1985 | Martin et al. |
| 4,576,219 A | 3/1986 | Uram |
| 4,583,581 A | 4/1986 | Ferguson et al. |
| 4,604,780 A | 8/1986 | Metcalfe |
| 4,637,449 A | 1/1987 | Mills et al. |
| 4,738,587 A | 4/1988 | Kildea |
| 4,859,141 A | 8/1989 | Maisch et al. |
| 4,905,750 A | 3/1990 | Wolf |
| 4,911,990 A | 3/1990 | Prewo et al. |
| 4,964,148 A | 10/1990 | Klostermann et al. |
| 4,986,333 A | 1/1991 | Gartland |
| 5,052,463 A | 10/1991 | Lechner et al. |
| 5,083,371 A | 1/1992 | Leibfried et al. |
| 5,243,759 A | 9/1993 | Brown et al. |
| 5,248,869 A | 9/1993 | Debell et al. |
| 5,273,104 A | 12/1993 | Renaud et al. |
| 5,291,654 A | 3/1994 | Judd et al. |
| 5,295,530 A | 3/1994 | O'Connor et al. |
| 5,332,023 A | 7/1994 | Mills |
| 5,350,002 A | 9/1994 | Orton |
| 5,355,668 A | 10/1994 | Weil et al. |
| 5,371,945 A | 12/1994 | Schnoor |
| 5,387,280 A | 2/1995 | Kennerknecht |
| 5,394,932 A | 3/1995 | Carozza et al. |
| 5,398,746 A | 3/1995 | Igarashi |
| 5,413,463 A | 5/1995 | Chin et al. |
| 5,465,780 A | 11/1995 | Muntner et al. |
| 5,467,528 A | 11/1995 | Bales et al. |
| 5,468,285 A | 11/1995 | Kennerknecht |
| 5,482,054 A | 1/1996 | Slater et al. |
| 5,498,132 A | 3/1996 | Carozza et al. |
| 5,505,250 A | 4/1996 | Jago |
| 5,507,336 A | 4/1996 | Tobin |
| 5,509,659 A | 4/1996 | Igarashi |
| 5,524,695 A | 6/1996 | Schwartz |
| 5,569,320 A | 10/1996 | Sasaki et al. |
| 5,611,848 A | 3/1997 | Sasaki et al. |
| 5,664,628 A | 9/1997 | Koehler et al. |
| 5,679,270 A | 10/1997 | Thornton et al. |
| 5,738,493 A | 4/1998 | Lee et al. |
| 5,778,963 A | 7/1998 | Parille et al. |
| 5,810,552 A | 9/1998 | Frasier |
| 5,820,774 A | 10/1998 | Dietrich |
| 5,909,773 A | 6/1999 | Koehler et al. |
| 5,924,483 A | 7/1999 | Frasier |
| 5,927,373 A | 7/1999 | Tobin |
| 5,947,181 A | 9/1999 | Davis |
| 5,951,256 A | 9/1999 | Dietrich |
| 5,976,457 A | 11/1999 | Amaya et al. |
| 6,029,736 A | 2/2000 | Naik et al. |
| 6,039,763 A | 3/2000 | Shelokov |
| 6,041,679 A | 3/2000 | Slater et al. |
| 6,068,806 A | 5/2000 | Dietrich |
| 6,186,741 B1 | 2/2001 | Webb et al. |
| 6,221,289 B1 | 4/2001 | Corbett et al. |
| 6,234,753 B1 | 5/2001 | Lee |
| 6,244,327 B1 | 6/2001 | Frasier |
| 6,251,526 B1 | 6/2001 | Staub |
| 6,327,943 B1 | 12/2001 | Wrigley et al. |
| 6,359,254 B1 | 3/2002 | Brown |
| 6,441,341 B1 | 8/2002 | Steibel et al. |
| 6,467,534 B1 | 10/2002 | Klug et al. |
| 6,474,348 B1 | 11/2002 | Beggs et al. |
| 6,505,678 B2 | 1/2003 | Mertins |
| 6,557,621 B1 | 5/2003 | Dierksmeier et al. |
| 6,578,623 B2 | 6/2003 | Keller et al. |
| 6,605,293 B1 | 8/2003 | Giordano et al. |
| 6,615,470 B2 | 9/2003 | Corderman et al. |
| 6,623,521 B2 | 9/2003 | Steinke et al. |
| 6,626,230 B1 | 9/2003 | Woodrum et al. |
| 6,634,858 B2 | 10/2003 | Roeloffs et al. |
| 6,637,500 B2 | 10/2003 | Shah et al. |
| 6,644,921 B2 | 11/2003 | Bunker et al. |
| 6,670,026 B2 | 12/2003 | Steibel et al. |
| 6,694,731 B2 | 2/2004 | Kamen et al. |
| 6,773,231 B2 | 8/2004 | Bunker et al. |
| 6,799,627 B2 | 10/2004 | Ray et al. |
| 6,800,234 B2 | 10/2004 | Ferguson et al. |
| 6,817,379 B2 | 11/2004 | Perla |
| 6,837,417 B2 | 1/2005 | Srinivasan |
| 6,896,036 B2 | 5/2005 | Schneiders et al. |
| 6,913,064 B2 | 7/2005 | Beals et al. |
| 6,929,054 B2 | 8/2005 | Beals et al. |
| 6,955,522 B2 | 10/2005 | Cunha et al. |
| 6,986,381 B2 | 1/2006 | Ray et al. |
| 7,028,747 B2 | 4/2006 | Widrig et al. |
| 7,036,556 B2 | 5/2006 | Caputo et al. |
| 7,052,710 B2 | 5/2006 | Giordano et al. |
| 7,073,561 B1 | 7/2006 | Henn |
| 7,093,645 B2 | 8/2006 | Grunstra et al. |
| 7,108,045 B2 | 9/2006 | Wiedemer et al. |
| 7,109,822 B2 | 9/2006 | Perkins et al. |
| 7,174,945 B2 | 2/2007 | Beals et al. |
| 7,185,695 B1 | 3/2007 | Santeler |
| 7,207,375 B2 | 4/2007 | Turkington et al. |
| 7,234,506 B2 | 6/2007 | Grunstra et al. |
| 7,237,375 B2 | 7/2007 | Humcke et al. |
| 7,237,595 B2 | 7/2007 | Beck et al. |
| 7,240,718 B2 | 7/2007 | Schmidt et al. |

(56) References Cited

U.S. PATENT DOCUMENTS

| | | |
|---|---|---|
| 7,243,700 B2 | 7/2007 | Beals et al. |
| 7,246,652 B2 | 7/2007 | Fowler |
| 7,270,170 B2 | 9/2007 | Beals et al. |
| 7,270,173 B2 | 9/2007 | Wiedemer et al. |
| 7,278,460 B2 | 10/2007 | Grunstra et al. |
| 7,278,463 B2 | 10/2007 | Snyder et al. |
| 7,306,026 B2 | 12/2007 | Memmen |
| 7,322,795 B2 | 1/2008 | Luczak et al. |
| 7,325,587 B2 | 2/2008 | Memmen |
| 7,334,625 B2 | 2/2008 | Judge et al. |
| 7,343,730 B2 | 3/2008 | Humcke et al. |
| 7,371,043 B2 | 5/2008 | Keller |
| 7,371,049 B2 | 5/2008 | Cunha et al. |
| 7,377,746 B2 | 5/2008 | Brassfield et al. |
| 7,410,342 B2 | 8/2008 | Matheny |
| 7,438,118 B2 | 10/2008 | Santeler |
| 7,448,433 B2 | 11/2008 | Ortiz et al. |
| 7,448,434 B2 | 11/2008 | Turkington et al. |
| 7,461,684 B2 | 12/2008 | Liu et al. |
| 7,478,994 B2 | 1/2009 | Cunha et al. |
| 7,517,225 B2 | 4/2009 | Cherian |
| 7,575,039 B2 | 8/2009 | Beals et al. |
| 7,588,069 B2 | 9/2009 | Munz et al. |
| 7,624,787 B2 | 12/2009 | Lee et al. |
| 7,625,172 B2 | 12/2009 | Walz et al. |
| 7,673,669 B2 | 3/2010 | Snyder et al. |
| 7,686,065 B2 | 3/2010 | Luczak |
| 7,713,029 B1 | 5/2010 | Davies |
| 7,717,676 B2 | 5/2010 | Cunha et al. |
| 7,722,327 B1 | 5/2010 | Liang |
| 7,802,613 B2 | 5/2010 | Bullied et al. |
| 7,727,495 B2 | 6/2010 | Burd et al. |
| 7,731,481 B2 | 6/2010 | Cunha et al. |
| 7,753,104 B2 | 7/2010 | Luczak et al. |
| 7,757,745 B2 | 7/2010 | Luczak |
| 7,771,210 B2 | 8/2010 | Cherian |
| 7,779,892 B2 | 8/2010 | Luczak et al. |
| 7,789,626 B1 | 9/2010 | Liang |
| 7,798,201 B2 | 9/2010 | Bewlay et al. |
| 7,806,681 B2 | 10/2010 | Fieck et al. |
| 7,861,766 B2 | 1/2011 | Bochiechio et al. |
| 7,882,884 B2 | 2/2011 | Beals et al. |
| 7,938,168 B2 | 5/2011 | Lee et al. |
| 7,947,233 B2 | 5/2011 | Burd et al. |
| 7,963,085 B2 | 6/2011 | Sypeck et al. |
| 7,993,106 B2 | 8/2011 | Walters |
| 8,057,183 B1 | 11/2011 | Liang |
| 8,066,483 B1 | 11/2011 | Liang |
| 8,100,165 B2 | 1/2012 | Piggush et al. |
| 8,113,780 B2 | 2/2012 | Cherolis et al. |
| 8,122,583 B2 | 2/2012 | Luczak et al. |
| 8,137,068 B2 | 3/2012 | Surace et al. |
| 8,162,609 B1 | 4/2012 | Liang |
| 8,167,537 B1 | 5/2012 | Plank et al. |
| 8,171,978 B2 | 5/2012 | Propheter-Hinckley et al. |
| 8,181,692 B2 | 5/2012 | Frasier et al. |
| 8,196,640 B1 | 6/2012 | Paulus et al. |
| 8,251,123 B2 | 8/2012 | Farris et al. |
| 8,251,660 B1 | 8/2012 | Liang |
| 8,261,810 B1 | 9/2012 | Liang |
| 8,291,963 B1 | 10/2012 | Trinks et al. |
| 8,297,455 B2 | 10/2012 | Smyth |
| 8,302,668 B1 | 11/2012 | Bullied et al. |
| 8,303,253 B1 | 11/2012 | Liang |
| 8,307,654 B1 | 11/2012 | Liang |
| 8,317,475 B1 | 11/2012 | Downs |
| 8,322,988 B1 | 12/2012 | Downs et al. |
| 8,336,606 B2 | 12/2012 | Piggush |
| 8,342,802 B1 | 1/2013 | Liang |
| 8,366,394 B1 | 2/2013 | Liang |
| 8,381,923 B2 | 2/2013 | Smyth |
| 8,414,263 B1 | 4/2013 | Liang |
| 8,500,401 B1 | 8/2013 | Liang |
| 8,506,256 B1 | 8/2013 | Brostmeyer et al. |
| 8,535,004 B2 | 9/2013 | Campbell |
| 8,622,113 B1 | 1/2014 | Rau, III |
| 8,678,766 B1 | 3/2014 | Liang |
| 8,734,108 B1 | 5/2014 | Liang |
| 8,753,083 B2 | 6/2014 | Lacy et al. |
| 8,770,931 B2 | 7/2014 | Alvanos et al. |
| 8,777,571 B1 | 7/2014 | Liang |
| 8,793,871 B2 | 8/2014 | Morrison et al. |
| 8,794,298 B2 | 8/2014 | Schlienger et al. |
| 8,807,943 B1 | 8/2014 | Liang |
| 8,813,812 B2 | 8/2014 | Ellgass et al. |
| 8,813,824 B2 | 8/2014 | Appleby et al. |
| 8,858,176 B1 | 10/2014 | Liang |
| 8,864,469 B1 | 10/2014 | Liang |
| 8,870,524 B1 | 10/2014 | Liang |
| 8,876,475 B1 | 11/2014 | Liang |
| 8,893,767 B2 | 11/2014 | Mueller et al. |
| 8,899,303 B2 | 12/2014 | Mueller et al. |
| 8,906,170 B2 | 12/2014 | Gigliotti, Jr. et al. |
| 8,911,208 B2 | 12/2014 | Propheter-Hinckley et al. |
| 8,915,289 B2 | 12/2014 | Mueller et al. |
| 8,936,068 B2 | 1/2015 | Lee et al. |
| 8,940,114 B2 | 1/2015 | James et al. |
| 8,969,760 B2 | 3/2015 | Hu et al. |
| 8,978,385 B2 | 3/2015 | Cunha |
| 8,993,923 B2 | 3/2015 | Hu et al. |
| 8,997,836 B2 | 4/2015 | Mueller et al. |
| 9,038,706 B2 | 5/2015 | Hillier |
| 9,051,838 B2 | 6/2015 | Wardle et al. |
| 9,057,277 B2 | 6/2015 | Appleby et al. |
| 9,057,523 B2 | 6/2015 | Cunha et al. |
| 9,061,350 B2 | 6/2015 | Bewlay et al. |
| 9,079,241 B2 | 7/2015 | Barber et al. |
| 9,079,803 B2 | 7/2015 | Xu |
| 9,174,271 B2 | 11/2015 | Newton et al. |
| 2001/0044651 A1 | 11/2001 | Steinke et al. |
| 2002/0029567 A1 | 3/2002 | Kamen et al. |
| 2002/0182056 A1 | 12/2002 | Widrig et al. |
| 2002/0187065 A1 | 12/2002 | Amaya et al. |
| 2002/0190039 A1 | 12/2002 | Steibel et al. |
| 2002/0197161 A1 | 12/2002 | Roeloffs et al. |
| 2003/0047197 A1 | 3/2003 | Beggs et al. |
| 2003/0062088 A1 | 4/2003 | Perla |
| 2003/0133799 A1 | 7/2003 | Widrig et al. |
| 2003/0150092 A1 | 8/2003 | Corderman et al. |
| 2003/0199969 A1 | 10/2003 | Steinke et al. |
| 2003/0201087 A1 | 10/2003 | Devine et al. |
| 2004/0024470 A1 | 2/2004 | Giordano et al. |
| 2004/0055725 A1 | 3/2004 | Ray et al. |
| 2004/0056079 A1 | 3/2004 | Srinivasan |
| 2004/0144089 A1 | 7/2004 | Kamen et al. |
| 2004/0154252 A1 | 8/2004 | Sypeck et al. |
| 2004/0159985 A1 | 8/2004 | Altoonian et al. |
| 2005/0006047 A1 | 1/2005 | Wang et al. |
| 2005/0016706 A1 | 1/2005 | Ray et al. |
| 2005/0087319 A1 | 4/2005 | Beals et al. |
| 2005/0133193 A1 | 6/2005 | Beals et al. |
| 2005/0247429 A1 | 11/2005 | Turkington et al. |
| 2006/0032604 A1 | 2/2006 | Beck et al. |
| 2006/0048553 A1 | 3/2006 | Almquist |
| 2006/0065383 A1 | 3/2006 | Ortiz et al. |
| 2006/0107668 A1 | 5/2006 | Cunha et al. |
| 2006/0118262 A1 | 6/2006 | Beals et al. |
| 2006/0118990 A1 | 6/2006 | Dierkes et al. |
| 2006/0237163 A1 | 10/2006 | Turkington et al. |
| 2006/0283168 A1 | 12/2006 | Humcke et al. |
| 2007/0044936 A1 | 3/2007 | Memmen |
| 2007/0059171 A1 | 3/2007 | Simms et al. |
| 2007/0107412 A1 | 5/2007 | Humcke et al. |
| 2007/0114001 A1 | 5/2007 | Snyder et al. |
| 2007/0116972 A1 | 5/2007 | Persky |
| 2007/0169605 A1 | 7/2007 | Szymanski |
| 2007/0177975 A1 | 8/2007 | Luczak et al. |
| 2007/0253816 A1 | 11/2007 | Walz et al. |
| 2008/0003849 A1 | 1/2008 | Cherian |
| 2008/0080979 A1 | 4/2008 | Brassfield et al. |
| 2008/0131285 A1 | 6/2008 | Albert et al. |
| 2008/0135718 A1 | 6/2008 | Lee et al. |
| 2008/0138208 A1 | 6/2008 | Walters |
| 2008/0138209 A1 | 6/2008 | Cunha et al. |

(56) References Cited

U.S. PATENT DOCUMENTS

| | | |
|---|---|---|
| 2008/0145235 A1 | 6/2008 | Cunha et al. |
| 2008/0169412 A1 | 7/2008 | Snyder et al. |
| 2008/0190582 A1 | 8/2008 | Lee et al. |
| 2009/0041587 A1 | 2/2009 | Konter et al. |
| 2009/0095435 A1 | 4/2009 | Luczak et al. |
| 2009/0181560 A1 | 7/2009 | Cherian |
| 2009/0255742 A1 | 10/2009 | Hansen |
| 2010/0021643 A1 | 1/2010 | Lane et al. |
| 2010/0150733 A1 | 6/2010 | Abdel-Messeh et al. |
| 2010/0200189 A1 | 8/2010 | Qi et al. |
| 2010/0219325 A1 | 9/2010 | Bullied et al. |
| 2010/0276103 A1 | 11/2010 | Bullied et al. |
| 2010/0304064 A1 | 12/2010 | Huttner |
| 2011/0048665 A1 | 3/2011 | Schlienger et al. |
| 2011/0068077 A1 | 3/2011 | Smyth |
| 2011/0132563 A1 | 6/2011 | Merrill et al. |
| 2011/0132564 A1 | 6/2011 | Merrill et al. |
| 2011/0135446 A1 | 6/2011 | Dube et al. |
| 2011/0146075 A1 | 6/2011 | Hazel et al. |
| 2011/0150666 A1 | 6/2011 | Hazel et al. |
| 2011/0189440 A1 | 8/2011 | Appleby et al. |
| 2011/0236221 A1 | 9/2011 | Campbell |
| 2011/0240245 A1 | 10/2011 | Schlienger et al. |
| 2011/0250078 A1 | 10/2011 | Bruce et al. |
| 2011/0250385 A1 | 10/2011 | Sypeck et al. |
| 2011/0293434 A1 | 12/2011 | Lee et al. |
| 2011/0315337 A1 | 12/2011 | Piggush |
| 2012/0161498 A1 | 6/2012 | Hansen |
| 2012/0163995 A1 | 6/2012 | Wardle et al. |
| 2012/0168108 A1 | 7/2012 | Farris et al. |
| 2012/0183412 A1 | 7/2012 | Lacy et al. |
| 2012/0186681 A1 | 7/2012 | Sun et al. |
| 2012/0186768 A1 | 7/2012 | Sun et al. |
| 2012/0193841 A1 | 8/2012 | Wang et al. |
| 2012/0237786 A1 | 9/2012 | Morrison et al. |
| 2012/0276361 A1 | 11/2012 | James et al. |
| 2012/0298321 A1 | 11/2012 | Smyth |
| 2013/0019604 A1 | 1/2013 | Cunha et al. |
| 2013/0025287 A1 | 1/2013 | Cunha |
| 2013/0025288 A1 | 1/2013 | Cunha et al. |
| 2013/0064676 A1 | 3/2013 | Salisbury et al. |
| 2013/0139990 A1 | 6/2013 | Appleby et al. |
| 2013/0177448 A1 | 7/2013 | Spangler |
| 2013/0220571 A1 | 8/2013 | Mueller et al. |
| 2013/0266816 A1 | 10/2013 | Xu |
| 2013/0280093 A1 | 10/2013 | Zelesky et al. |
| 2013/0318771 A1 | 12/2013 | Luczak et al. |
| 2013/0323033 A1 | 12/2013 | Lutjen et al. |
| 2013/0327602 A1 | 12/2013 | Barber et al. |
| 2013/0333855 A1 | 12/2013 | Merrill et al. |
| 2013/0338267 A1 | 12/2013 | Appleby et al. |
| 2014/0023497 A1 | 1/2014 | Giglio et al. |
| 2014/0031458 A1 | 1/2014 | Jansen |
| 2014/0033736 A1 | 2/2014 | Propheter-Hinckley et al. |
| 2014/0068939 A1 | 3/2014 | Devine, II et al. |
| 2014/0076857 A1 | 3/2014 | Hu et al. |
| 2014/0076868 A1 | 3/2014 | Hu et al. |
| 2014/0093387 A1 | 4/2014 | Pointon et al. |
| 2014/0140860 A1 | 5/2014 | Tibbott et al. |
| 2014/0169981 A1 | 6/2014 | Bales et al. |
| 2014/0199177 A1 | 7/2014 | Propheter-Hinckley et al. |
| 2014/0202650 A1 | 7/2014 | Song et al. |
| 2014/0284016 A1 | 9/2014 | Vander Wal |
| 2014/0311315 A1 | 10/2014 | Isaac |
| 2014/0314581 A1 | 10/2014 | McBrien et al. |
| 2014/0342175 A1 | 11/2014 | Morrison et al. |
| 2014/0342176 A1 | 11/2014 | Appleby et al. |
| 2014/0356560 A1 | 12/2014 | Prete et al. |
| 2014/0363305 A1 | 12/2014 | Shah et al. |
| 2015/0053365 A1 | 2/2015 | Mueller et al. |
| 2015/0174653 A1 | 6/2015 | Verner et al. |
| 2015/0184857 A1 | 7/2015 | Cunha et al. |
| 2015/0306657 A1 | 10/2015 | Frank |

FOREIGN PATENT DOCUMENTS

| | | |
|---|---|---|
| EP | 0025481 B1 | 2/1983 |
| EP | 0111600 A1 | 6/1984 |
| EP | 0190114 A1 | 8/1986 |
| EP | 0319244 A2 | 6/1989 |
| EP | 0324229 A2 | 7/1989 |
| EP | 0324229 B1 | 7/1992 |
| EP | 0539317 A1 | 4/1993 |
| EP | 0556946 A1 | 8/1993 |
| EP | 0559251 A1 | 9/1993 |
| EP | 0585183 A1 | 3/1994 |
| EP | 0319244 B1 | 5/1994 |
| EP | 0661246 A1 | 7/1995 |
| EP | 0539317 B1 | 11/1995 |
| EP | 0715913 A1 | 6/1996 |
| EP | 0725606 A1 | 8/1996 |
| EP | 0750956 A2 | 1/1997 |
| EP | 0750957 A1 | 1/1997 |
| EP | 0792409 A1 | 9/1997 |
| EP | 0691894 B1 | 10/1997 |
| EP | 0805729 A2 | 11/1997 |
| EP | 0818256 A1 | 1/1998 |
| EP | 0556946 B1 | 4/1998 |
| EP | 0559251 B1 | 12/1998 |
| EP | 0585183 B1 | 3/1999 |
| EP | 0899039 A2 | 3/1999 |
| EP | 0750956 B1 | 5/1999 |
| EP | 0661246 B1 | 9/1999 |
| EP | 0725606 B1 | 12/1999 |
| EP | 0968062 A1 | 1/2000 |
| EP | 0805729 B1 | 8/2000 |
| EP | 1055800 A2 | 11/2000 |
| EP | 1070829 A2 | 1/2001 |
| EP | 1124509 A1 | 8/2001 |
| EP | 1142658 A1 | 10/2001 |
| EP | 1161307 A1 | 12/2001 |
| EP | 1163970 A1 | 12/2001 |
| EP | 1178769 A1 | 2/2002 |
| EP | 0715913 B1 | 4/2002 |
| EP | 0968062 B1 | 5/2002 |
| EP | 0951579 B1 | 1/2003 |
| EP | 1284338 A2 | 2/2003 |
| EP | 0750957 B1 | 3/2003 |
| EP | 1341481 A2 | 9/2003 |
| EP | 1358958 A1 | 11/2003 |
| EP | 1367224 A1 | 12/2003 |
| EP | 0818256 B1 | 2/2004 |
| EP | 1124509 B1 | 3/2004 |
| EP | 1425483 A2 | 6/2004 |
| EP | 1055800 B1 | 10/2004 |
| EP | 1163970 B1 | 3/2005 |
| EP | 1358958 B1 | 3/2005 |
| EP | 1519116 A1 | 3/2005 |
| EP | 1531019 A1 | 5/2005 |
| EP | 0899039 B1 | 11/2005 |
| EP | 1604753 A1 | 12/2005 |
| EP | 1659264 A2 | 5/2006 |
| EP | 1178769 B1 | 7/2006 |
| EP | 1382403 B1 | 9/2006 |
| EP | 1759788 A2 | 3/2007 |
| EP | 1764171 A1 | 3/2007 |
| EP | 1813775 A2 | 8/2007 |
| EP | 1815923 A1 | 8/2007 |
| EP | 1849965 A2 | 10/2007 |
| EP | 1070829 B1 | 1/2008 |
| EP | 1142658 B1 | 3/2008 |
| EP | 1927414 A2 | 6/2008 |
| EP | 1930097 A1 | 6/2008 |
| EP | 1930098 A1 | 6/2008 |
| EP | 1930099 A1 | 6/2008 |
| EP | 1932604 A1 | 6/2008 |
| EP | 1936118 A2 | 6/2008 |
| EP | 1939400 A2 | 7/2008 |
| EP | 1984162 A1 | 10/2008 |
| EP | 1604753 B1 | 11/2008 |
| EP | 2000234 A2 | 12/2008 |
| EP | 2025869 A1 | 2/2009 |
| EP | 1531019 B1 | 3/2010 |

(56) References Cited

FOREIGN PATENT DOCUMENTS

| | | |
|---|---|---|
| EP | 2212040 A1 | 8/2010 |
| EP | 2246133 A1 | 11/2010 |
| EP | 2025869 B1 | 12/2010 |
| EP | 2335845 A1 | 6/2011 |
| EP | 2336493 A2 | 6/2011 |
| EP | 2336494 A2 | 6/2011 |
| EP | 1930097 B1 | 7/2011 |
| EP | 2362822 A2 | 9/2011 |
| EP | 2366476 A1 | 9/2011 |
| EP | 2392774 A1 | 12/2011 |
| EP | 1930098 B1 | 2/2012 |
| EP | 2445668 A2 | 5/2012 |
| EP | 2445669 A2 | 5/2012 |
| EP | 2461922 A1 | 6/2012 |
| EP | 1659264 B1 | 11/2012 |
| EP | 2519367 A2 | 11/2012 |
| EP | 2537606 A1 | 12/2012 |
| EP | 1927414 B1 | 1/2013 |
| EP | 2549186 A2 | 1/2013 |
| EP | 2551592 A2 | 1/2013 |
| EP | 2551593 A2 | 1/2013 |
| EP | 2559533 A2 | 2/2013 |
| EP | 2559534 A2 | 2/2013 |
| EP | 2559535 A2 | 2/2013 |
| EP | 2576099 A1 | 4/2013 |
| EP | 2000234 B1 | 7/2013 |
| EP | 2614902 A2 | 7/2013 |
| EP | 2650062 A2 | 10/2013 |
| EP | 2246133 B1 | 7/2014 |
| EP | 2366476 B1 | 7/2014 |
| EP | 2777841 A1 | 9/2014 |
| EP | 1849965 B1 | 2/2015 |
| EP | 2834031 A2 | 2/2015 |
| EP | 1341481 B1 | 3/2015 |
| EP | 2841710 A1 | 3/2015 |
| EP | 2855857 A2 | 4/2015 |
| EP | 2880276 A1 | 6/2015 |
| EP | 2937161 A1 | 10/2015 |
| GB | 731292 A | 6/1955 |
| GB | 800228 A | 8/1958 |
| GB | 2102317 A | 2/1983 |
| GB | 2118078 A | 10/1983 |
| JP | 5-330957 A * | 12/1993 ............... B22C 9/10 |
| JP | H1052731 A | 2/1998 |
| WO | 9615866 A1 | 5/1996 |
| WO | 9618022 A1 | 6/1996 |
| WO | 2010036801 A2 | 4/2010 |
| WO | 2010040746 A1 | 4/2010 |
| WO | 2010151833 A2 | 12/2010 |
| WO | 2010151838 A2 | 12/2010 |
| WO | 2011019667 A1 | 2/2011 |
| WO | 2013163020 A1 | 10/2013 |
| WO | 2014011262 A2 | 1/2014 |
| WO | 2014022255 A1 | 2/2014 |
| WO | 2014028095 A2 | 2/2014 |
| WO | 2014093826 A2 | 6/2014 |
| WO | 2014105108 A1 | 7/2014 |
| WO | 2014109819 A1 | 7/2014 |
| WO | 2014133635 A2 | 9/2014 |
| WO | 2014179381 A1 | 11/2014 |
| WO | 2015006026 A1 | 1/2015 |
| WO | 2015006440 A1 | 1/2015 |
| WO | 2015006479 A1 | 1/2015 |
| WO | 2015009448 A1 | 1/2015 |
| WO | 2015042089 A1 | 3/2015 |
| WO | 2015050987 A1 | 4/2015 |
| WO | 2015053833 A1 | 4/2015 |
| WO | 2015073068 A1 | 5/2015 |
| WO | 2015073657 A1 | 5/2015 |
| WO | 2015080854 A1 | 6/2015 |
| WO | 2015094636 A1 | 6/2015 |

OTHER PUBLICATIONS

Liu et al, "Effect of nickel coating on bending properties of stereolithography photo-polymer SL5195", Materials & Design, vol. 26, Issue 6, pp. 493-496, 2005.

European Search Report and Opinion issued in connection with corresponding EP Application No. 16202422.8 dated May 8, 2017.

European Search Report and Opinion issued in connection with related EP Application No. 16204602.3 dated May 12, 2017.

European Search Report and Opinion issued in connection with related EP Application No. 16204609.8 dated May 12, 2017.

European Search Report and Opinion issued in connection with related EP Application No. 16204610.6 dated May 17, 2017.

European Search Report and Opinion issued in connection with related EP Application No. 16204613.0 dated May 22, 2017.

European Search Report and Opinion issued in connection with related EP Application No. 16204605.6 dated May 26, 2017.

European Search Report and Opinion issued in connection with related EP Application No. 16204607.2 dated May 26, 2017.

European Search Report and Opinion issued in connection with related EP Application No. 16204608.0 dated May 26, 2017.

European Search Report and Opinion issued in connection with related EP Application No. 16204617.1 dated May 26, 2017.

European Search Report and Opinion issued in connection with related EP Application No. 16204614.8.0 dated Jun. 2, 2017.

European Search Report and Opinion issued in connection with related EP Application No. 17168418.6 dated Aug. 10, 2017.

* cited by examiner

METHOD AND ASSEMBLY FOR FORMING COMPONENTS HAVING AN INTERNAL PASSAGE DEFINED THEREIN

BACKGROUND

The field of the disclosure relates generally to components having an internal passage defined therein, and more particularly to forming internal passages that include interior passage features.

Some components require an internal passage to be defined therein, for example, in order to perform an intended function. For example, but not by way of limitation, some components, such as hot gas path components of gas turbines, are subjected to high temperatures. At least some such components have internal passages defined therein to receive a flow of a cooling fluid, such that the components are better able to withstand the high temperatures. For another example, but not by way of limitation, some components are subjected to friction at an interface with another component. At least some such components have internal passages defined therein to receive a flow of a lubricant to facilitate reducing the friction.

Moreover, a performance of at least some such internal passages is improved by the addition of interior passage features, that is, structural features that extend within the passage and alter fluid flow within the passage, as compared to fluid flow within an otherwise similar, but substantially smooth-walled, passage. As just one example, interior passage features that extend inward from a wall of such passages may be used to turbulate a flow of a cooling fluid flowed through the passage, such that a thermal boundary layer proximate the passage wall is disrupted and heat transfer efficiency is improved.

At least some known components having an internal passage defined therein are formed in a mold, with a core of ceramic material extending within the mold cavity at a location selected for the internal passage. After a molten metal alloy is introduced into the mold cavity around the ceramic core and cooled to form the component, the ceramic core is removed, such as by chemical leaching, to form the internal passage. One known approach to creating interior passage features is to form complementary features on a surface of the ceramic core prior to forming the component in the mold. However, at least some known ceramic cores are fragile, resulting in cores that are difficult and expensive to produce and handle without damage. In particular, the addition of complementary surface features on the core introduces stress concentrations that increase a risk of cracking of the ceramic core. Another approach is to add the interior passage features after the component is formed in the mold, for example, by using an electrochemical process to shape the passage wall. However, at least some such post-forming processes are relatively time-consuming and expensive. Moreover, with respect to both known approaches, a geometrical complexity of the interior passage features that can be formed is substantially limited.

BRIEF DESCRIPTION

In one aspect, a method of forming a component having an internal passage defined therein is provided. The method includes positioning a jacketed core with respect to a mold. The jacketed core includes a hollow structure that includes an interior portion shaped to define at least one interior passage feature of the internal passage. The jacketed core also includes an inner core disposed within the hollow structure and complementarily shaped by the interior portion of the hollow structure. The method also includes introducing a component material in a molten state into a cavity of the mold to form the component, such that the inner core defines the internal passage including the at least one interior passage feature defined therein.

In another aspect, a mold assembly for use in forming a component having an internal passage defined therein is provided. The mold assembly includes a mold defining a mold cavity therein, and a jacketed core positioned with respect to the mold. The jacketed core includes a hollow structure that includes an interior portion shaped to define at least one interior passage feature of the internal passage. The jacketed core also includes an inner core disposed within the hollow structure and complementarily shaped by the interior portion of the hollow structure, such that the inner core is configured to define the internal passage and the at least one interior passage feature defined therein when the component is formed in the mold.

DRAWINGS

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

The exemplary components and methods described herein overcome at least some of the disadvantages associated with known assemblies and methods for forming a component having an internal passage that includes interior passage features defined therein. The embodiments described herein provide a jacketed core positioned with respect to a mold. The jacketed core includes a hollow structure and an inner core disposed within the hollow structure. The inner core extends within the mold cavity to define a position of the internal passage within the component to be formed in the mold. The hollow structure is substantially absorbable by a component material introduced into the mold cavity to form the component. An interior portion of the hollow structure is shaped to define complementary features of the inner core, such that the complementary inner core features define the interior passage features when the component is formed.

Figure 1:
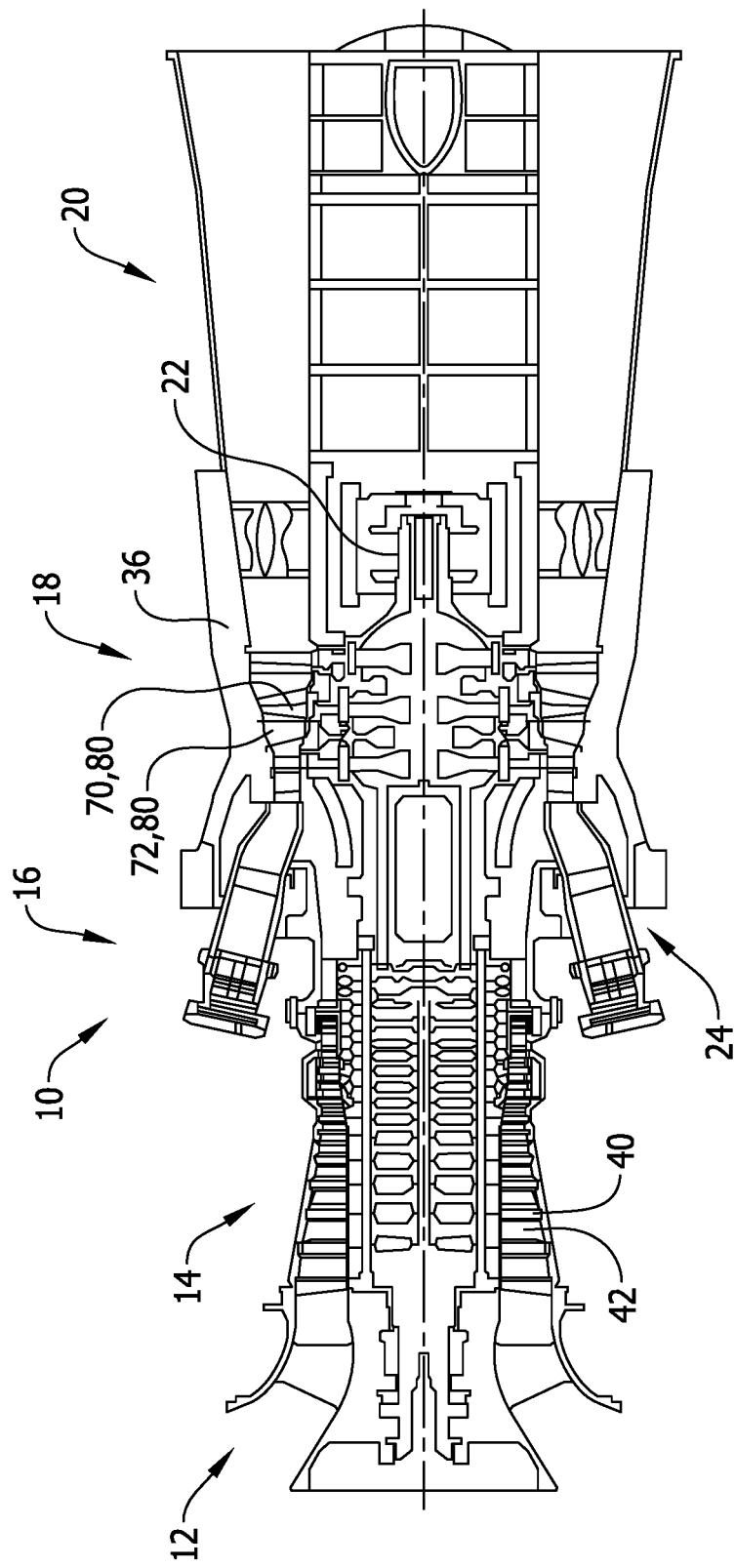
FIG. 1 is a schematic diagram of an exemplary rotary machine.

FIG. 1 is a schematic view of an exemplary rotary machine 10 having components for which embodiments of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20. In alternative embodiments, rotary machine 10 is any rotary machine for which components formed with internal passages having interior passage features as described herein are suitable. Moreover, although embodiments of the present disclosure are described in the context of a rotary machine for purposes of illustration, it should be understood that the embodiments described herein are applicable in any context that involves a component suitably formed with an internal passage having interior passage features defined therein.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air towards compressor section 14. Compressor section 14 compresses the air to a higher pressure and temperature. More specifically, rotor shaft 22 imparts rotational energy to at least one circumferential row of compressor blades 40 coupled to rotor shaft 22 within compressor section 14. In the exemplary embodiment, each row of compressor blades 40 is preceded by a circumferential row of compressor stator vanes 42 extending radially inward from casing 36 that direct the air flow into compressor blades 40. The rotational energy of compressor blades 40 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 24, in which a fuel, for example, natural gas and/or fuel oil, is injected into the air flow, and the fuel-air mixture is ignited to generate high temperature combustion gases that are channeled towards turbine section 18.

Turbine section 18 converts the thermal energy from the combustion gas stream to mechanical rotational energy. More specifically, the combustion gases impart rotational energy to at least one circumferential row of rotor blades 70 coupled to rotor shaft 22 within turbine section 18. In the exemplary embodiment, each row of rotor blades 70 is preceded by a circumferential row of turbine stator vanes 72 extending radially inward from casing 36 that direct the combustion gases into rotor blades 70. Rotor shaft 22 may be coupled to a load (not shown) such as, but not limited to, an electrical generator and/or a mechanical drive application. The exhausted combustion gases flow downstream from turbine section 18 into exhaust section 20. Components of rotary machine 10 are designated as components 80. Components 80 proximate a path of the combustion gases are subjected to high temperatures during operation of rotary machine 10. Additionally or alternatively, components 80 include any component suitably formed with an internal passage having interior passage features defined therein.

Figure 2:
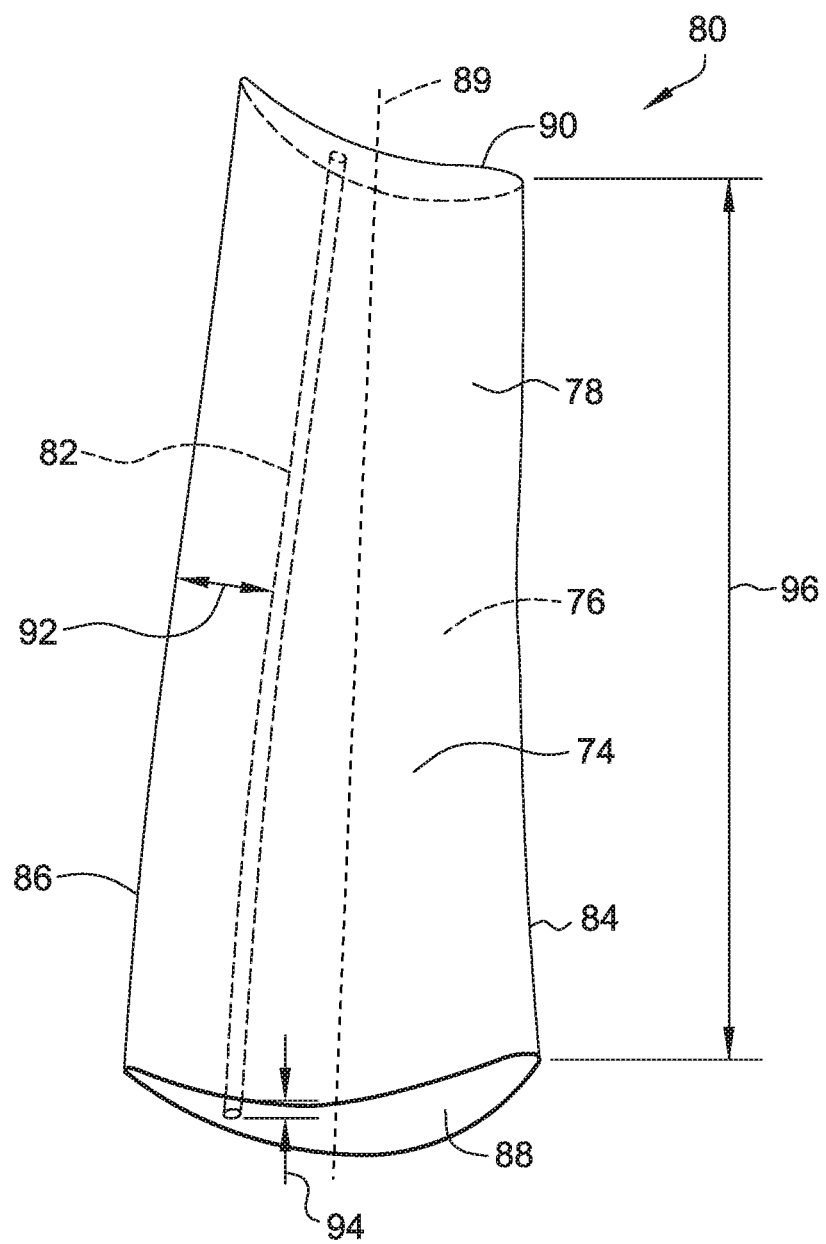
FIG. 2 is a schematic perspective view of an exemplary component for use with the rotary machine shown in FIG. 1.

FIG. 2 is a schematic perspective view of an exemplary component 80, illustrated for use with rotary machine 10 (shown in FIG. 1). Component 80 includes at least one internal passage 82 defined therein. For example, a cooling fluid is provided to internal passage 82 during operation of rotary machine 10 to facilitate maintaining component 80 below a temperature of the hot combustion gases. Although only one internal passage 82 is illustrated, it should be understood that component 80 includes any suitable number of internal passages 82 formed as described herein.

Component 80 is formed from a component material 78. In the exemplary embodiment, component material 78 is a suitable nickel-based superalloy. In alternative embodiments, component material 78 is at least one of a cobalt-based superalloy, an iron-based alloy, and a titanium-based alloy. In other alternative embodiments, component material 78 is any suitable material that enables component 80 to be formed as described herein.

In the exemplary embodiment, component 80 is one of rotor blades 70 or stator vanes 72. In alternative embodiments, component 80 is another suitable component of rotary machine 10 that is capable of being formed with an internal passage having interior passage features as described herein. In still other embodiments, component 80 is any component for any suitable application that is suitably formed with an internal passage having interior passage features defined therein.

In the exemplary embodiment, rotor blade 70, or alternatively stator vane 72, includes a pressure side 74 and an opposite suction side 76. Each of pressure side 74 and suction side 76 extends from a leading edge 84 to an opposite trailing edge 86. In addition, rotor blade 70, or alternatively stator vane 72, extends from a root end 88 to an opposite tip end 90, defining a blade length 96. In alternative embodiments, rotor blade 70, or alternatively stator vane 72, has any suitable configuration that is capable of being formed with an internal passage as described herein.

In certain embodiments, blade length 96 is at least about 25.4 centimeters (cm) (10 inches). Moreover, in some embodiments, blade length 96 is at least about 50.8 cm (20 inches). In particular embodiments, blade length 96 is in a range from about 61 cm (24 inches) to about 101.6 cm (40 inches). In alternative embodiments, blade length 96 is less than about 25.4 cm (10 inches). For example, in some embodiments, blade length 96 is in a range from about 2.54 cm (1 inch) to about 25.4 cm (10 inches). In other alternative embodiments, blade length 96 is greater than about 101.6 cm (40 inches).

In the exemplary embodiment, internal passage 82 extends from root end 88 to tip end 90. In alternative embodiments, internal passage 82 extends within component 80 in any suitable fashion, and to any suitable extent, that enables internal passage 82 to be formed as described herein. In certain embodiments, internal passage 82 is nonlinear. For example, component 80 is formed with a predefined twist along an axis 89 defined between root end 88 and tip end 90, and internal passage 82 has a curved shape complementary to the axial twist. In some embodiments, internal passage 82 is positioned at a substantially constant distance 94 from pressure side 74 along a length of internal passage 82. Alternatively or additionally, a chord of component 80 tapers between root end 88 and tip end 90, and internal passage 82 extends nonlinearly complementary to the taper, such that internal passage 82 is positioned at a substantially constant distance 92 from trailing edge 86 along the length of internal passage 82. In alternative embodiments, internal passage 82 has a nonlinear shape that is complementary to any suitable contour of component 80. In other alternative embodiments, internal passage 82 is nonlinear and other than complementary to a contour of component 80. In some embodiments, internal passage 82 having a nonlinear shape facilitates satisfying a preselected cooling criterion for component 80. In alternative embodiments, internal passage 82 extends linearly.

In some embodiments, internal passage 82 has a substantially circular cross-sectional perimeter. In alternative embodiments, internal passage 82 has a substantially ovoid cross-sectional perimeter. In other alternative embodiments, internal passage 82 has any suitably shaped cross-sectional perimeter that enables internal passage 82 to be formed as described herein. Moreover, in certain embodiments, a shape of the cross-sectional perimeter of internal passage 82 is substantially constant along a length of internal passage 82. In alternative embodiments, the shape of the cross-sectional perimeter of internal passage 82 varies along a length of internal passage 82 in any suitable fashion that enables internal passage 82 to be formed as described herein.

Figure 3:
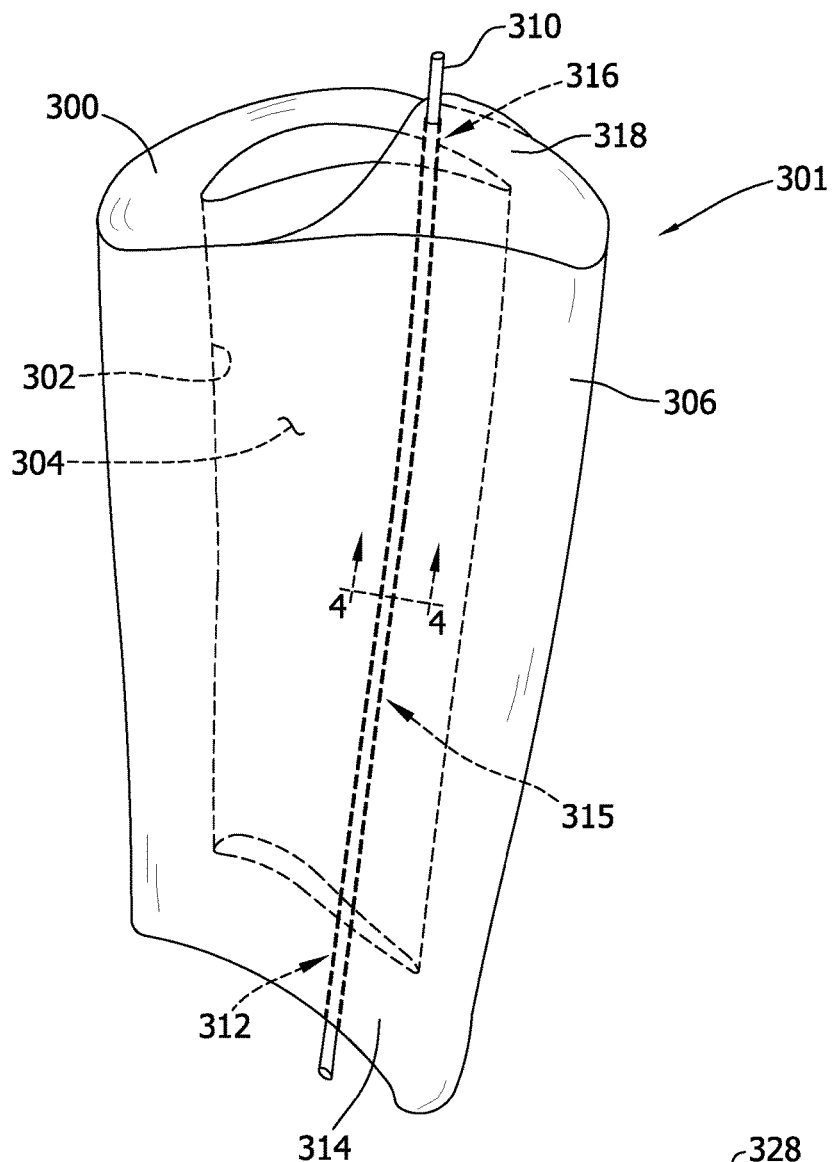
FIG. 3 is a schematic perspective view of an exemplary mold assembly for making the component shown in FIG. 2, the mold assembly including a jacketed core positioned with respect to a mold.
Figure 4:
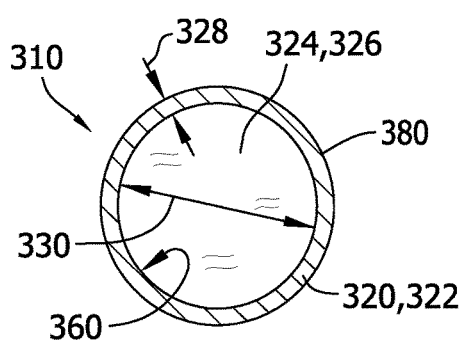
FIG. 4 is a schematic cross-section of an exemplary jacketed core for use with the mold assembly shown in FIG. 3, taken along lines 4-4 shown in FIG. 3.

FIG. 3 is a schematic perspective view of a mold assembly 301 for making component 80 (shown in FIG. 2). Mold assembly 301 includes a jacketed core 310 positioned with respect to a mold 300. FIG. 4 is a schematic cross-section of jacketed core 310 taken along lines 4-4 shown in FIG. 3. With reference to FIGS. 2-4, an interior wall 302 of mold 300 defines a mold cavity 304. Interior wall 302 defines a shape corresponding to an exterior shape of component 80, such that component material 78 in a molten state can be introduced into mold cavity 304 and cooled to form component 80. It should be recalled that, although component 80 in the exemplary embodiment is rotor blade 70, or alternatively stator vane 72, in alternative embodiments component 80 is any component suitably formable with an internal passage having interior passage features defined therein, as described herein.

Jacketed core 310 is positioned with respect to mold 300 such that a portion 315 of jacketed core 310 extends within mold cavity 304. Jacketed core 310 includes a hollow structure 320 formed from a first material 322, and an inner core 324 disposed within hollow structure 320 and formed from an inner core material 326. Inner core 324 is shaped to define a shape of internal passage 82, and inner core 324 of portion 315 of jacketed core 310 positioned within mold cavity 304 defines a position of internal passage 82 within component 80.

Hollow structure 320 includes an outer wall 380 that substantially encloses inner core 324 along a length of inner core 324. An interior portion 360 of hollow structure 320 is located interiorly with respect to outer wall 380, such that inner core 324 is complementarily shaped by interior portion 360 of hollow structure 320. In certain embodiments, hollow structure 320 defines a generally tubular shape. For example, but not by way of limitation, hollow structure 320 is initially formed from a substantially straight metal tube that is suitably manipulated into a nonlinear shape, such as a curved or angled shape, as necessary to define a selected nonlinear shape of inner core 324 and, thus, of internal passage 82. In alternative embodiments, hollow structure 320 defines any suitable shape that enables inner core 324 to define a shape of internal passage 82 as described herein.

In the exemplary embodiment, hollow structure 320 has a wall thickness 328 that is less than a characteristic width 330 of inner core 324. Characteristic width 330 is defined herein as the diameter of a circle having the same cross-sectional area as inner core 324. In alternative embodiments, hollow structure 320 has a wall thickness 328 that is other than less than characteristic width 330. A shape of a cross-sectional perimeter of inner core 324 is circular in the exemplary embodiment shown in FIGS. 3 and 4. Alternatively, the shape of the cross-sectional perimeter of inner core 324 corresponds to any suitable cross-sectional perimeter of internal passage 82 that enables internal passage 82 to function as described herein.

Mold 300 is formed from a mold material 306. In the exemplary embodiment, mold material 306 is a refractory ceramic material selected to withstand a high temperature environment associated with the molten state of component material 78 used to form component 80. In alternative embodiments, mold material 306 is any suitable material that enables component 80 to be formed as described herein. Moreover, in the exemplary embodiment, mold 300 is formed by a suitable investment casting process. For example, but not by way of limitation, a suitable pattern material, such as wax, is injected into a suitable pattern die to form a pattern (not shown) of component 80, the pattern is repeatedly dipped into a slurry of mold material 306 which is allowed to harden to create a shell of mold material 306, and the shell is dewaxed and fired to form mold 300. In alternative embodiments, mold 300 is formed by any suitable method that enables mold 300 to function as described herein.

In certain embodiments, jacketed core 310 is secured relative to mold 300 such that jacketed core 310 remains fixed relative to mold 300 during a process of forming component 80. For example, jacketed core 310 is secured such that a position of jacketed core 310 does not shift during introduction of molten component material 78 into mold cavity 304 surrounding jacketed core 310. In some embodiments, jacketed core 310 is coupled directly to mold 300. For example, in the exemplary embodiment, a tip portion 312 of jacketed core 310 is rigidly encased in a tip portion 314 of mold 300. Additionally or alternatively, a root portion 316 of jacketed core 310 is rigidly encased in a root portion 318 of mold 300 opposite tip portion 314. For example, but not by way of limitation, mold 300 is formed by investment casting as described above, and jacketed core 310 is securely coupled to the suitable pattern die such that tip portion 312 and root portion 316 extend out of the pattern die, while portion 315 extends within a cavity of the die. The pattern material is injected into the die around jacketed core 310 such that portion 315 extends within the pattern. The investment casting causes mold 300 to encase tip portion 312 and/or root portion 316. Additionally or alternatively, jacketed core 310 is secured relative to mold 300 in any other suitable fashion that enables the position of jacketed core 310 relative to mold 300 to remain fixed during a process of forming component 80.

First material 322 is selected to be at least partially absorbable by molten component material 78. In certain embodiments, component material 78 is an alloy, and first material 322 is at least one constituent material of the alloy. For example, in the exemplary embodiment, component material 78 is a nickel-based superalloy, and first material 322 is substantially nickel, such that first material 322 is substantially absorbable by component material 78 when component material 78 in the molten state is introduced into mold cavity 304. In alternative embodiments, component material 78 is any suitable alloy, and first material 322 is at least one material that is at least partially absorbable by the molten alloy. For example, component material 78 is a cobalt-based superalloy, and first material 322 is substantially cobalt. For another example, component material 78 is an iron-based alloy, and first material 322 is substantially iron. For another example, component material 78 is a titanium-based alloy, and first material 322 is substantially titanium.

In certain embodiments, wall thickness 328 is sufficiently thin such that first material 322 of portion 315 of jacketed core 310, that is, the portion that extends within mold cavity 304, is substantially absorbed by component material 78 when component material 78 in the molten state is introduced into mold cavity 304. For example, in some such embodiments, first material 322 is substantially absorbed by component material 78 such that no discrete boundary delineates hollow structure 320 from component material 78 after component material 78 is cooled. Moreover, in some such embodiments, first material 322 is substantially absorbed such that, after component material 78 is cooled, first material 322 is substantially uniformly distributed within component material 78. For example, a concentration of first material 322 proximate inner core 324 is not detectably higher than a concentration of first material 322 at other locations within component 80. For example, and without limitation, first material 322 is nickel and component material 78 is a nickel-based superalloy, and no detectable higher nickel concentration remains proximate inner core 324 after component material 78 is cooled, resulting in a distribution of nickel that is substantially uniform throughout the nickel-based superalloy of formed component 80.

In alternative embodiments, wall thickness 328 is selected such that first material 322 is other than substantially absorbed by component material 78. For example, in some embodiments, after component material 78 is cooled, first material 322 is other than substantially uniformly distributed within component material 78. For example, a concentration of first material 322 proximate inner core 324 is detectably higher than a concentration of first material 322 at other locations within component 80. In some such embodiments, first material 322 is partially absorbed by component material 78 such that a discrete boundary delineates hollow structure 320 from component material 78 after component material 78 is cooled. Moreover, in some such embodiments, first material 322 is partially absorbed by component material 78 such that at least a portion of hollow structure 320 proximate inner core 324 remains intact after component material 78 is cooled.

In the exemplary embodiment, inner core material 326 is a refractory ceramic material selected to withstand a high temperature environment associated with the molten state of component material 78 used to form component 80. For example, but without limitation, inner core material 326 includes at least one of silica, alumina, and mullite. Moreover, in the exemplary embodiment, inner core material 326 is selectively removable from component 80 to form internal passage 82. For example, but not by way of limitation, inner core material 326 is removable from component 80 by a suitable process that does not substantially degrade component material 78, such as, but not limited to, a suitable chemical leaching process. In certain embodiments, inner core material 326 is selected based on a compatibility with, and/or a removability from, component material 78. In alternative embodiments, inner core material 326 is any suitable material that enables component 80 to be formed as described herein.

In some embodiments, jacketed core 310 is formed by filling hollow structure 320 with inner core material 326. For example, but not by way of limitation, inner core material 326 is injected as a slurry into hollow structure 320, and inner core material 326 is dried within hollow structure 320 to form jacketed core 310. Moreover, in certain embodiments, hollow structure 320 substantially structurally reinforces inner core 324, thus reducing potential problems that would be associated with production, handling, and use of an unreinforced inner core 324 to form component 80 in some embodiments. For example, in certain embodiments, inner core 324 is a relatively brittle ceramic material subject to a relatively high risk of fracture, cracking, and/or other damage. Thus, in some such embodiments, forming and transporting jacketed core 310 presents a much lower risk of damage to inner core 324, as compared to using an unjacketed inner core 324. Similarly, in some such embodiments, forming a suitable pattern around jacketed core 310 to be used for investment casting of mold 300, such as by injecting a wax pattern material into a pattern die around jacketed core 310, presents a much lower risk of damage to inner core 324, as compared to using an unjacketed inner core 324. Thus, in certain embodiments, use of jacketed core 310 presents a much lower risk of failure to produce an acceptable component 80 having internal passage 82 defined therein, as compared to the same steps if performed using an unjacketed inner core 324 rather than jacketed core 310. Thus, jacketed core 310 facilitates obtaining advantages associated with positioning inner core 324 with respect to mold 300 to define internal passage 82, while reducing or eliminating fragility problems associated with inner core 324. In alternative embodiments, hollow structure 320 does not substantially structurally reinforce inner core 324.

For example, in certain embodiments, such as, but not limited to, embodiments in which component 80 is rotor blade 70, characteristic width 330 of inner core 324 is within a range from about 0.050 cm (0.020 inches) to about 1.016 cm (0.400 inches), and wall thickness 328 of hollow structure 320 is selected to be within a range from about 0.013 cm (0.005 inches) to about 0.254 cm (0.100 inches). More particularly, in some such embodiments, characteristic width 330 is within a range from about 0.102 cm (0.040 inches) to about 0.508 cm (0.200 inches), and wall thickness 328 is selected to be within a range from about 0.013 cm (0.005 inches) to about 0.038 cm (0.015 inches). For another example, in some embodiments, such as, but not limited to, embodiments in which component 80 is a stationary component, such as but not limited to stator vane 72, characteristic width 330 of inner core 324 is greater than about 1.016 cm (0.400 inches), and/or wall thickness 328 is selected to be greater than about 0.254 cm (0.100 inches). In alternative embodiments, characteristic width 330 is any suitable value that enables the resulting internal passage 82 to perform its intended function, and wall thickness 328 is selected to be any suitable value that enables jacketed core 310 to function as described herein.

Moreover, in certain embodiments, prior to introduction of inner core material 326 within hollow structure 320 to form jacketed core 310, hollow structure 320 is pre-formed to correspond to a selected nonlinear shape of internal passage 82. For example, first material 322 is a metallic material that is relatively easily shaped prior to filling with inner core material 326, thus reducing or eliminating a need to separately form and/or machine inner core 324 into a nonlinear shape. Moreover, in some such embodiments, the structural reinforcement provided by hollow structure 320 enables subsequent formation and handling of inner core 324 in a non-linear shape that would be difficult to form and handle as an unjacketed inner core 324. Thus, jacketed core 310 facilitates formation of internal passage 82 having a curved and/or otherwise non-linear shape of increased complexity, and/or with a decreased time and cost. In certain embodiments, hollow structure 320 is pre-formed to correspond to the nonlinear shape of internal passage 82 that is complementary to a contour of component 80. For example, but not by way of limitation, component 80 is one of rotor blade 70 and stator vane 72, and hollow structure 320 is pre-formed in a shape complementary to at least one of an axial twist and a taper of component 80, as described above.

Figure 5:
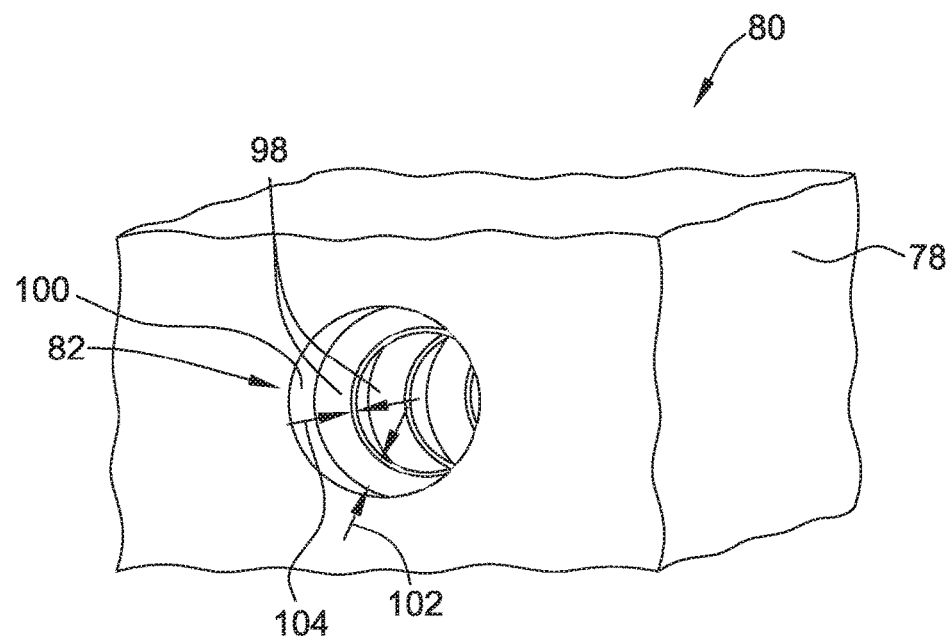
FIG. 5 is a schematic perspective view of a portion of another exemplary component for use with the rotary machine shown in FIG. 1, the component including an internal passage having a plurality of interior passage features.
Figure 6:
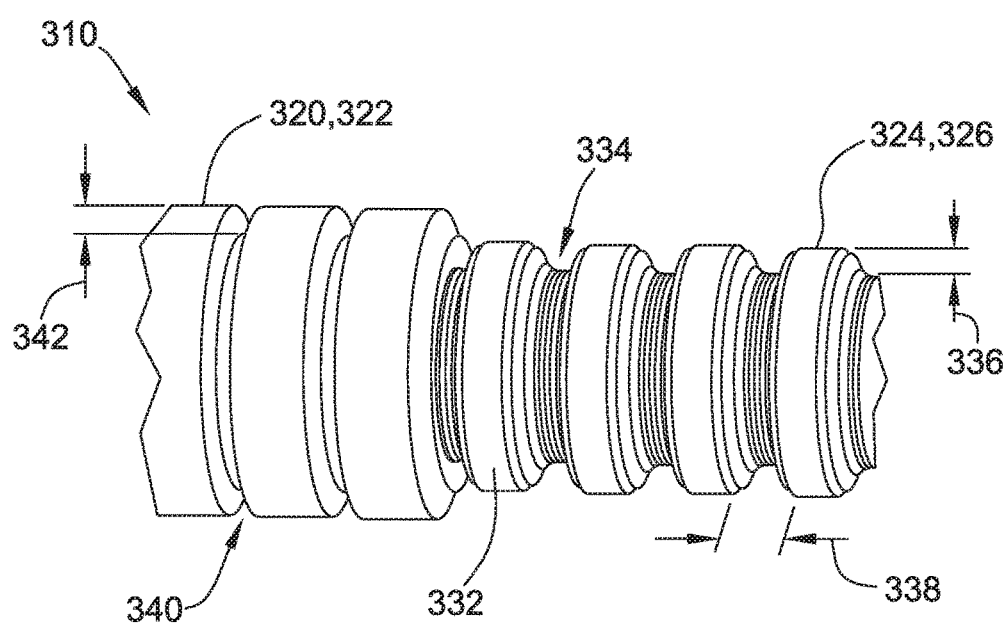
FIG. 6 is a schematic perspective cutaway view of another exemplary jacketed core for use with the mold assembly shown in FIG. 3 to form the component having interior passage features as shown in FIG. 5.

FIG. 5 is a schematic perspective view of a portion of another exemplary component 80 that includes internal passage 82 having a plurality of interior passage features 98. FIG. 6 is a schematic perspective cutaway view of another exemplary jacketed core 310 for use in mold assembly 301 to form component 80 having interior passage features 98 as shown in FIG. 5. In particular, a portion of hollow structure 320 is cut away in the view of FIG. 6 to illustrate features of inner core 324. With reference to FIGS. 5 and 6, internal passage 82 is generally defined by an interior wall 100 of component 80, and interior passage features 98 are shaped to define local variations in a flow path defined by internal passage 82. For example, but not by way of limitation, interior passage features 98 are turbulators that extend radially inward from interior wall 100 generally towards a center of internal passage 82, and are shaped to disrupt a thermal boundary layer flow along interior wall 100 to improve a heat transfer capability of a cooling fluid provided to internal passage 82 during operation of rotary machine 10 (shown in FIG. 1). Alternatively, interior passage features 98 are any structure shaped to define local variations in the flow path defined by internal passage 82.

As discussed above, the shape of inner core 324 defines the shape of internal passage 82. In certain embodiments, inner core 324 is complementarily shaped by interior portion 360 of hollow structure 320 such that inner core 324 defines internal passage 82 including at least one interior passage feature 98 defined therein. For example, inner core 324 is complementarily shaped by interior portion 360 to include at least one complementary feature 331, and the at least one complementary feature 331 has a shape complementary to a shape of at least one interior passage feature 98. Thus, when molten component material 78 is introduced into mold cavity 304 (shown in FIG. 3) surrounding jacketed core 310 and first material 322 is absorbed into molten component material 78, component material 78 in the molten state couples against the at least one complementary feature 331 to form the at least one interior passage feature 98. Additionally or alternatively, to an extent that a portion of interior portion 360 of hollow structure 320 adjacent inner core 324 remains intact after molten component material 78 is introduced into mold cavity 304 and cooled, the intact portion of interior portion 360 coupled against the at least one complementary feature 331 defines the at least one interior passage feature 98.

For example, in the illustrated embodiment, the at least one complementary feature 331 is a plurality of recessed features 334 defined in an exterior surface 332 of inner core 324. Each recessed feature 334 has a shape complementary to a shape of a corresponding interior passage feature 98, such that when molten component material 78 is introduced into mold cavity 304 and first material 322 is absorbed into molten component material 78, molten component material 78 fills the plurality of recessed features 334. Cooled component material 78 within recessed features 334 forms the plurality of interior passage features 98 after inner core 324 is removed, such as, but not limited to, by using a chemical leaching process. For example, each recessed feature 334 is defined with a depth 336 and a width 338, and each corresponding interior passage feature 98 is formed as a ridge extending interiorly from interior wall 100, with a ridge height 102 substantially equal to depth 336 and a ridge width 104 substantially equal to width 338. Thus, exterior surface 332 defines a general shape of interior wall 100, and complementary features 331 of inner core 324 define a shape of interior passage features 98 of internal passage 82.

In some embodiments, the shaping of interior portion 360 of hollow structure 320 to define interior passage features 98 during formation of component 80 in mold 300 enables the formation of interior passage features 98 at locations along internal passage 82 that could not be consistently and reliably formed using other methods. For example, inner core material 326 is a relatively brittle ceramic material, and independently shaping a similar, but unjacketed, inner core 324 to define complementary features 331 increases a risk of cracking or fracturing inner core 324. The risk is further increased for an unjacketed inner core 324 having a large length-to-diameter (L/d) ratio and/or a substantially nonlinear shape. For another example, adding interior passage features 98 along a length of internal passage 82 in a subsequent separate process, that is, after component 80 is formed is relatively difficult to achieve with repeatability and precision, and particularly so for internal passages 82 having a large length-to-diameter (L/d) ratio and/or a substantially nonlinear shape.

In certain embodiments, interior portion 360 of hollow structure 320 is pre-formed to complementarily shape inner core 324, and thus to define a selected shape of interior passage features 98, prior to disposing inner core material 326 within hollow structure 320. For example, hollow structure 320 is crimped at a plurality of locations to define a plurality of indentations 340, and each indentation 340 causes interior portion 360 of hollow structure 320 to define a corresponding recessed feature 334 when hollow structure 320 is filled with inner core material 326. For example, a depth 342 of each indentation 340, in cooperation with wall thickness 328, defines depth 336 of the corresponding recessed feature 334.

In the illustrated embodiment, each indentation 340 is defined as a groove that extends circumferentially around outer wall 380 of hollow structure 320, such that each recessed feature 334 is correspondingly defined as a groove that extends circumferentially around inner core 324. In turn, each recessed feature 334 defines a corresponding interior passage feature 98 as a ridge that extends circumferentially around a perimeter of internal passage 82 when component 80 is formed. In alternative embodiments, each indentation 340 has a shape selected to form any suitable shape for each corresponding recessed feature 334 and interior passage feature 98.

Figure 7:
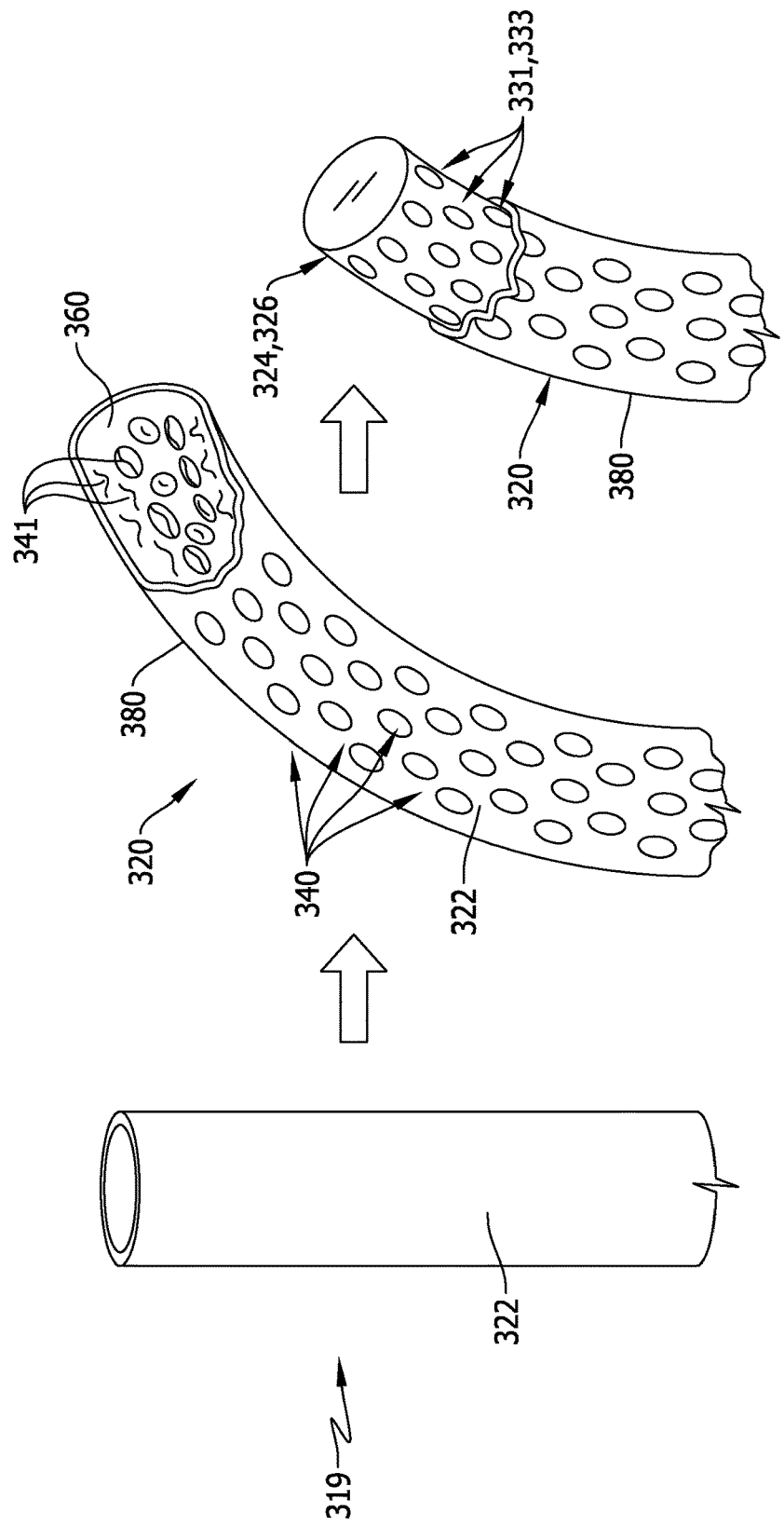
FIG. 7 is a schematic illustration of an exemplary straight tube, an exemplary hollow structure (shown in cut-away view) formed from the exemplary straight tube, and an exemplary jacketed core (shown in cut-away view) formed from the hollow structure and for use with the mold assembly shown in FIG. 3.

FIG. 7 is a schematic illustration of an exemplary straight tube 319, formed from first material 322 and having a generally circular cross-section, an exemplary hollow structure 320 (shown in cut-away view) formed from straight tube 319, and an exemplary jacketed core 310 (shown in cut-away view) formed from hollow structure 320 and for use with mold assembly 301 (shown in FIG. 3). In the illustrated embodiment, hollow structure 320 has a nonlinear shape along its length. For example, but not by way of limitation, the nonlinear shape is configured to match a shape of internal passage 82 having a curved shape complementary to a shape of component 80 (shown in FIG. 2). Hollow structure 320 also includes interior portion 360 shaped to define at least one interior passage feature 98 (not shown) of the corresponding internal passage 82. Interior portion 360 defines at least one complementary feature 331 of inner core 324.

More specifically, in the illustrated embodiment, hollow structure 320 includes indentations 340 formed as dimples pressed into outer wall 380 of hollow structure 320. Each indentation 340 forms a corresponding protrusion 341 on interior portion 360 of hollow structure 320. When inner core material 326 is disposed within hollow structure 320 to form jacketed core 310, protrusions 341 form complementary features 331 as dimple imprints 333 in inner core 324. Complementary features 331 are thus configured to form interior passage features 98 within passage 82 (shown in FIG. 2) shaped substantially identically to protrusions 341. Although interior portion 360 is illustrated as having protrusions 341, in alternative embodiments, interior portion 360 is shaped in any suitable fashion to define a selected shape of complementary features 331 and of interior passage features 98.

In some embodiments, shaping hollow structure 320 to define the selected shape of complementary features 331 prior to disposing inner core material 326 within hollow structure 320 reduces potential problems associated with forming complementary features 331 after jacketed core 310 is formed. For example, inner core material 326 is a relatively brittle ceramic material, such that a relatively high risk of fracture, cracking, and/or other damage to inner core 324 would be presented by machining or otherwise manipulating jacketed core 310 directly to form complementary features 331. Thus, shaping hollow structure 320 to define the selected shape of complementary features 331 prior to disposing inner core material 326 within hollow structure 320 facilitates forming interior passage features 98 integrally with internal passage 82, while reducing or eliminating fragility problems associated with inner core 324.

In certain embodiments, hollow structure 320 having at least one of (i) a nonlinear shape along its length and (ii) an interior portion 360 shaped to define at least one interior passage feature 98 is formed from straight tube 319 using a suitable tube press (not shown). For example, a die is configured to press-bend straight tube 319 to match a preselected nonlinear shape of internal passage 82, and the die surface includes protrusions configured to substantially simultaneously form a preselected pattern of indentations 340 on hollow structure 320. In some such embodiments, straight tube 319 is a standard or commercial-off-the-shelf item, reducing a cost of manufacture of hollow structure 320. Moreover, in some such embodiments, a one-step press-bend manufacture further facilitates increased speed and decreased cost of manufacture of hollow structure 320. In alternative embodiments, any suitable tube-bending process and/or interior portion-forming process, including multiple-step processes, is used to form hollow structure 320 from straight tube 319.

Additionally, in some such embodiments, the press-bend process is configured to selectively transform a circular cross-sectional perimeter of at least a portion of straight tube 319 into a selected non-circular cross-sectional perimeter of at least a portion of hollow structure 320. For example, in some embodiments, a press die is configured to plastically deform the circular cross-sectional perimeter of straight tube 319 into an ovoid cross-sectional perimeter of hollow structure 320. In some embodiments, the ovoid cross-sectional perimeter provides a visual cue for proper orientation of jacketed core 310 relative to mold 300 to form mold assembly 301 (shown in FIG. 3). Moreover, in some embodiments, a corresponding preselected ovoid cross-sectional perimeter of internal passage 82 provides improved cooling performance proximate trailing edge 86 of rotor blade 70.

In alternative embodiments, hollow structure 320 is formed in a selected nonlinear shape by coupling together a plurality of longitudinal segments (not shown), wherein each segment is individually pre-formed, such as from a respective straight tube 319, to define a shape and/or a preselected pattern of interior passage features 98 of a corresponding segment of internal passage 82. In other alternative embodiments, hollow structure 320 is formed with a selected non-circular cross-sectional perimeter by coupling together a suitable plurality of longitudinally extending partial perimeter sections, such as a pair of half-perimeter sections, along longitudinal seams (not shown), wherein each partial perimeter section is pre-formed, such as from a respective blank of sheet metal (not shown), to define a non-circular cross-sectional perimeter and/or a preselected pattern of interior passage features 98 of internal passage 82. In other alternative embodiments, any suitable manufacturing process, including combination or multiple-step processes, is used to form hollow structure 320 having a nonlinear shape and/or non-circular cross-section and/or preselected pattern of interior passage features 98.

Figure 8:
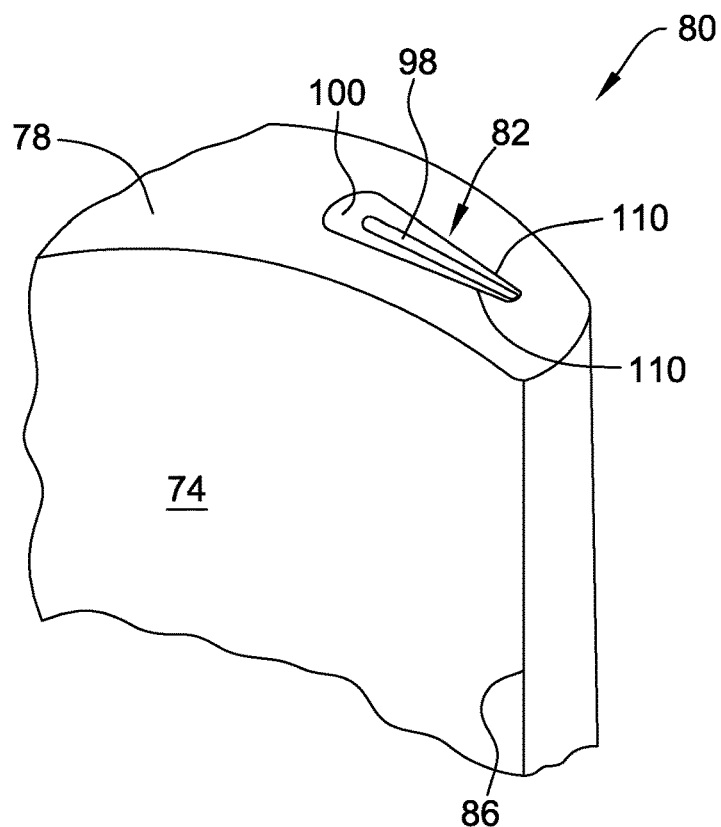
FIG. 8 is a schematic perspective view of a portion of another exemplary component for use with the rotary machine shown in FIG. 1, the component including an internal passage having a contoured cross-section.
Figure 9:
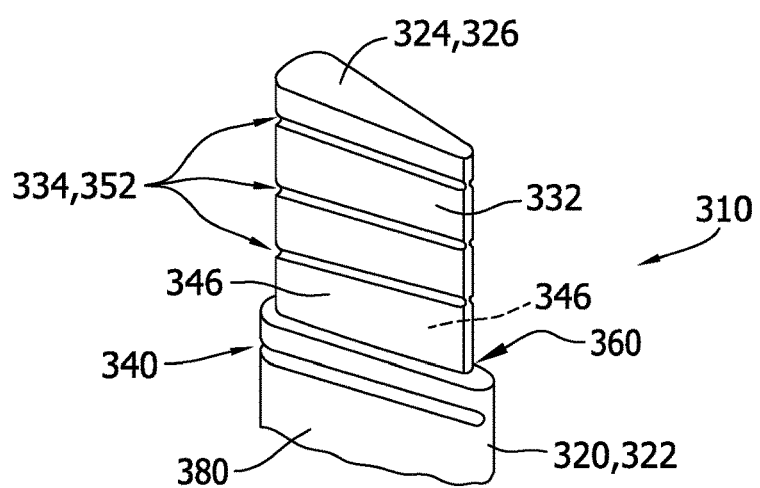
FIG. 9 is a schematic perspective cutaway view of another exemplary jacketed core for use with the mold assembly shown in FIG. 3 to form the component having the internal passage shown in FIG. 9.

For another example, FIG. 8 is a schematic perspective view of a portion of another exemplary component 80 that includes internal passage 82 having a non-circular cross-sectional perimeter. FIG. 9 is a schematic perspective cutaway view of another exemplary jacketed core 310 for use with mold assembly 301 to form component 80 having internal passage 82 as shown in FIG. 8. In particular, a portion of hollow structure 320 is cut away in the view of FIG. 9 to illustrate features of inner core 324.

With reference to FIGS. 8 and 9, in the exemplary embodiment, component 80 is one of rotor blade 70 and stator vane 72, and internal passage 82 is defined in component 80 proximate trailing edge 86. More specifically, internal passage 82 is defined by interior wall 100 of component 80 to have a contoured cross-sectional perimeter corresponding to a tapered geometry of trailing edge 86. Interior passage features 98 are defined along opposing elongated edges 110 of internal passage 82 to function as turbulators, and extend inward from interior wall 100 towards a center of internal passage 82. Although interior passage features 98 are illustrated as a repeating pattern of elongated ridges each transverse to an axial direction of internal passage 82, it should be understood that in alternative embodiments, interior passage features 98 have any suitable shape, orientation, and/or pattern that enables internal passage 82 to function for its intended purpose.

As discussed above, the shape of exterior surface 332 and complementary features 331 of inner core 324 define the shape of interior wall 100 and interior passage features 98 of internal passage 82. More specifically, inner core 324 has an elongated, tapered cross-sectional perimeter corresponding to the contoured cross-sectional perimeter of internal passage 82. Complementary features 331 are implemented as recessed features 334. In the exemplary embodiment, recessed features 334 are defined as elongated notches 352 in opposing elongated sides 346 of exterior surface 332, and have a shape complementary to a shape of interior passage features 98, as described above. In alternative embodiments, component 80 has any suitable geometry, and inner core 324 is shaped to form internal passage 82 having any suitable shape that suitably corresponds to the geometry of component 80.

In certain embodiments, hollow structure 320 is preformed in a suitable press-bend process, as described above, to selectively transform a circular cross-sectional perimeter of at least a portion of straight tube 319 (shown in FIG. 7) into the selected non-circular cross-sectional perimeter of hollow structure 320, prior to disposing inner core material 326 within hollow structure 320. More specifically, the non-circular cross-sectional perimeter of hollow structure 320 is selected to define the corresponding shape of exterior surface 332 of inner core 324, and thus to define the selected contoured cross-sectional perimeter of internal passage 82. In addition, the press-bend process shapes interior portion 360 of hollow structure 320 to define interior passage features 98. More specifically, the press-bend process crimps straight tube 319 at a plurality of locations to define a plurality of indentations 340 in outer wall 380 of hollow structure 320, and each indentation 340 defines a corresponding notch 352 of inner core 324 when hollow structure 320 is filled with inner core material 326. In alternative embodiments, hollow structure 320 is formed in any suitable fashion that enables hollow structure 320 to function as described herein.

Figure 10:
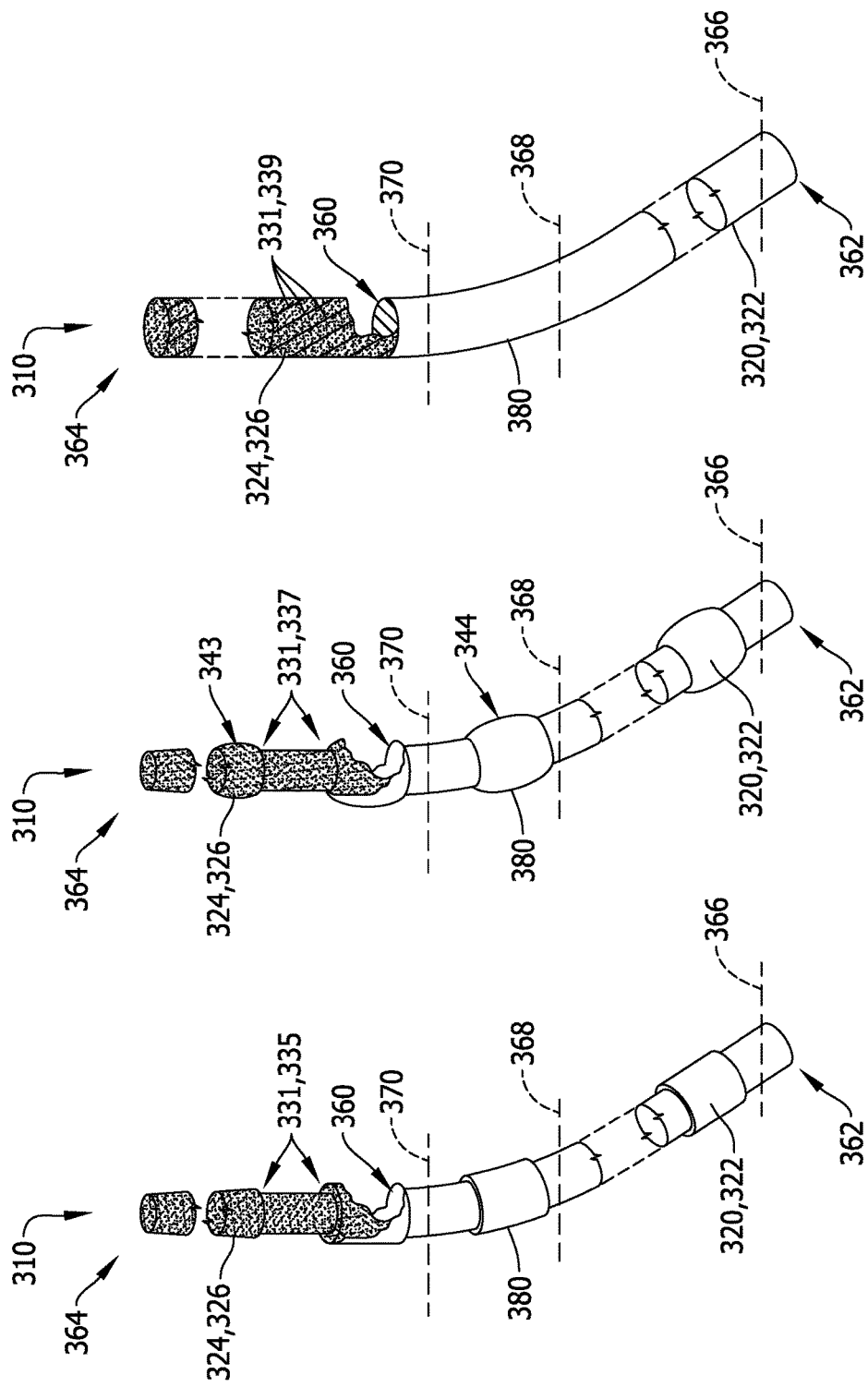
FIG. 10 is a schematic perspective cutaway view of three additional exemplary embodiments of a jacketed core for use with the mold assembly shown in FIG. 3.

FIG. 10 is a schematic perspective cutaway view of three additional embodiments of jacketed core 310 for use with mold assembly 301 (shown in FIG. 3). In each embodiment, jacketed core 310 is formed from hollow structure 320 having interior portion 360 shaped to define at least one interior passage feature 98 of internal passage 82 (shown in FIG. 2). In particular, interior portion 360 is shaped to define at least one complementary feature 331 of inner core 324. In the first embodiment, shown on the left in FIG. 10, interior portion 360 of hollow structure 320 is shaped to define sharp-edged bead-type turbulators within internal passage 82. Correspondingly, interior portion 360 is shaped to define complementary features 331 of inner core 324 as sharp-edged bead structures 335 when inner core material 326 is added to hollow structure 320. In the second embodiment shown in the middle in FIG. 10, interior portion 360 of hollow structure 320 is shaped to define smooth-edged bead-type turbulators within internal passage 82. Correspondingly, interior portion 360 is shaped to define complementary features 331 as smooth-edged bead structures 337 when inner core material 326 is added to hollow structure 320. In the third embodiment shown on the right in FIG. 10, interior portion 360 of hollow structure 320 is shaped to define rifled grooves along internal passage 82. Correspondingly, interior portion 360 is shaped to define complementary features 331 of inner core 324 as rifled groove structures 339 when inner core material 326 is added to hollow structure 320.

In certain embodiments, hollow structure 320 is formed using a suitable additive manufacturing process. For example, hollow structure 320 extends from a first end 362 to an opposite second end 364, and a computer design model of hollow structure 320, including the structure of interior portion 360, is sliced into a series of thin, parallel planes between first end 362 and second end 364. A computer numerically controlled (CNC) machine deposits successive layers of first material 322 from first end 362 to second end 364 in accordance with the model slices to form hollow structure 320. Three such representative layers are indicated as layers 366, 368, and 370. In some embodiments, the successive layers of first material 322 are deposited using at least one of a direct metal laser melting (DMLM) process, a direct metal laser sintering (DMLS) process, and a selective laser sintering (SLS) process. Additionally or alternatively, the successive layers of first material 322 are deposited using any suitable process that enables hollow structure 320 to be formed as described herein.

In some embodiments, the formation of hollow structure 320 by an additive manufacturing process enables interior portion 360 of hollow structure 320 to be formed with a structural intricacy, precision, and/or repeatability that is not achievable by adding the structure of interior portion 360 to a preformed straight tube 319 (shown in FIG. 7). Accordingly, the formation of hollow structure 320 by an additive manufacturing process enables the shaping of complementary features 331 of inner core 324, and thus of interior passage features 98 of internal passage 82, with a correspondingly increased structural intricacy, precision, and/or repeatability. Additionally or alternatively, the formation of interior portion 360 of hollow structure 320 during an additive manufacturing process enables the subsequent complementary formation of interior passage features 98 at locations along internal passage 82 that could not be reliably added to internal passage 82 in a separate process after initial formation of component 80 in mold 300, as discussed above.

Alternatively, in some embodiments, hollow structure 320 is at least partially formed by adding at least one bulged region 344 to an initially straight tube, such as straight tube 319 (shown in FIG. 7). For example, but not by way of limitation, the at least one bulged region 344 is formed by one of mechanical ram expansion and hydroforming of hollow structure 320. Bulged regions 344 shape interior portion 360 of hollow structure 320 to define at least one complementary feature 331 of inner core 324 as at least one bulged feature 343. For example, in an embodiment, smooth-edged bead structures 337 shown in the middle embodiment in FIG. 10 are formed as bulged features 343 complementary to bulged regions 344 when inner core material 326 is added to hollow structure 320. Bulged features 343 are shaped to define generally recessed passage wall features 98. For example, bulged features 343 implemented as smooth-edged bead structures 337 are complementarily shaped to define smooth-edged bead-type turbulators within internal passage 82. Alternatively, bulged features 344 are shaped such that interior portion 360 of hollow structure 320 defines any suitable passage wall feature 98 that enables internal passage 82 to function as described herein.

Figure 12:
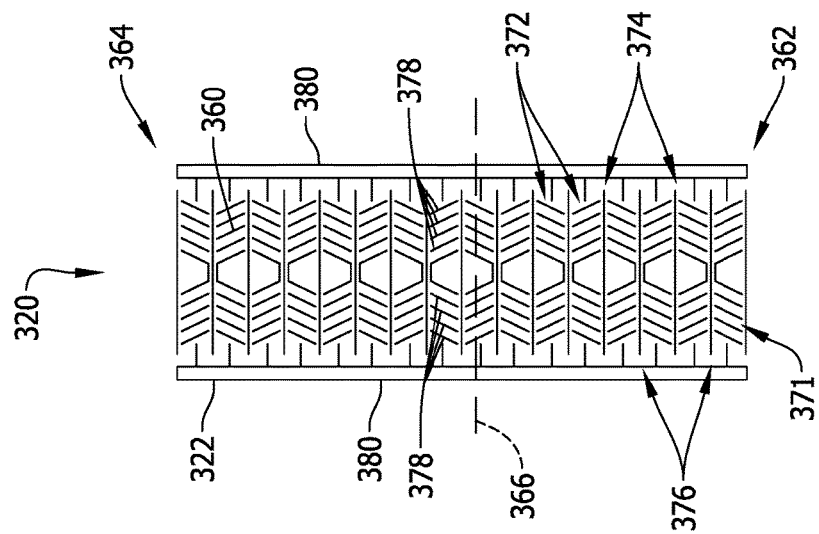
FIG. 12 is a schematic front cross-section view of the hollow structure shown in FIG. 11, taken along lines 12-12 shown in FIG. 11.
Figure 11:
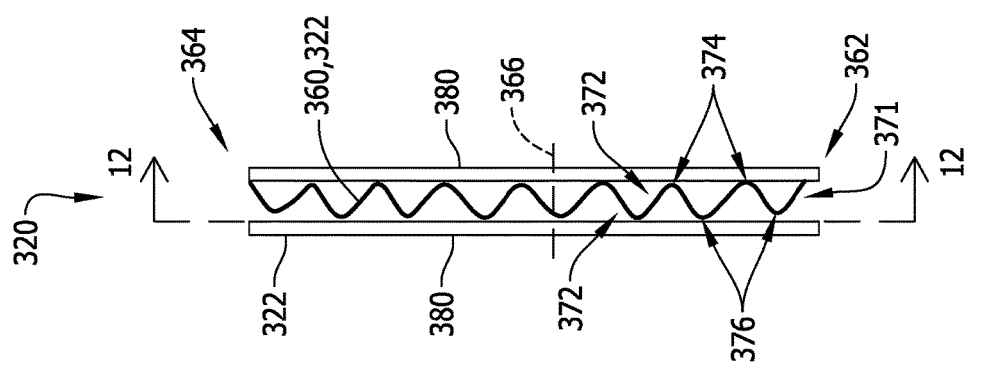
FIG. 11 is a schematic cross-sectional side view of another exemplary hollow structure for use in forming a jacketed core for use with the mold assembly shown in FIG. 3.

FIG. 11 is a schematic cross-sectional side view of another exemplary embodiment of hollow structure 320 for use in forming jacketed core 310 for use with mold assembly 301 (shown in FIG. 3). FIG. 12 is a schematic front cross-section view of the embodiment of hollow structure 320 shown in FIG. 11, taken along lines 12-12. As described above, hollow structure 320 has outer wall 380 configured to enclose inner core 324 (shown in FIG. 4) along a length of hollow structure 320. In the illustrated embodiment, outer wall 380 defines a generally constant, rectangular cross-sectional perimeter of hollow structure 320. In alternative embodiments, outer wall 380 defines any suitable cross-sectional perimeter that enables jacketed core 310 to function as described herein.

In certain embodiments, interior portion 360 of hollow structure 320 defines a louver structure 371 shaped to define a louvered interior passage feature 98 of internal passage 82 (shown in FIG. 2). For example, in the illustrated embodiment, interior portion 360 defines a plurality of obliquely disposed convolution faces 372 that each extend from one of a plurality of peaks 374 to one of a plurality of valleys 376. Peaks 374 and valleys 376 are defined on opposite sides of hollow structure 320, such that each peak 374 and each valley 376 lies proximate outer wall 380 of hollow structure 320.

In the exemplary embodiment, each convolution face 372 includes a plurality of louvers 378. In certain embodiments, internal passage 82 (shown in FIG. 2) is used for cooling purposes, and louvers 378 are suitably arranged such that the corresponding louvered interior passage features 98 defined thereby facilitate selected flow characteristics for a fluid within internal passage 82. For example, in the illustrated embodiment, louvers 378 on each convolution face 372 are spaced and angled such that the corresponding louvered interior passage features 98 defined thereby facilitate thin film converging/diverging laminar flow convection, while maintaining pressure loss through internal passage 82 within an acceptable range. In alternative embodiments, convolution faces 372 each have any suitable structure that enables hollow structure 320 to function as described herein.

In certain embodiments, hollow structure 320 is again formed using a suitable additive manufacturing process, in which, for example, a CNC machine deposits successive layers of first material 322 from first end 362 to second end 364 to form hollow structure 320. More specifically, the CNC machine deposits successive layers of first material 322 to simultaneously form each successive layer, such as representative layer 366, of outer wall 380 and interior portion 360. As described above, forming hollow structure 320 using a suitable additive manufacturing process enables forming interior portion 360 of hollow structure 320 with a structural intricacy, precision, and/or repeatability that is not achievable using other methods. For example, in some embodiments, forming hollow structure 320 using a suitable additive manufacturing process enables interior portion 360 of hollow structure 320 to define any of a variety of suitable louver configurations for heat transfer applications on a scale suitable for use as interior passage features 98 in internal passage 82. In alternative embodiments, hollow structure 320 is formed using any suitable process that enables hollow structure 320 to function as described herein.

As described above, jacketed core 310 is formed by disposing inner core material 326 within hollow structure 320, such that inner core 324 is complementarily shaped by interior portion 360 of hollow structure 320. In particular, interior portion 360 defines complementary features 331 of inner core 324 as a complement or "negative image" of louver structure 371 of interior portion 360. Subsequently, during formation of component 80 in mold 300, molten component material 78 at least partially absorbs first material 322 from hollow structure 320, including from interior portion 360. For example, interior portion 360 is formed from first material 322 and/or another suitable material that is compatible with component material 78, and interior portion 360 is subjected to absorptive contact with component material 78 through peaks 374 and valleys 376 after outer wall 380 is at least partially absorbed. Molten component material 78 couples against complementary features 331 of inner core 324 to form louvered interior passage features 98 that are shaped substantially identically to louver structure 371 of interior portion 360 of hollow structure 320.

With reference to FIGS. 5-12, although the illustrated embodiments show interior portion 360 of hollow structure 320 configured to define complementary features 331 of inner core 324 as recessed features 334, dimple imprints 333, sharp-edged bead structures 335, smooth-edged bead structures 337, rifled groove structures 339, and the complement of louver structure 371 to define a shape of interior passage features 98, it should be understood that this disclosure contemplates interior portion 360 of hollow structure 320 configured to define complementary features 331 having any suitable additional or alternative shape that enables inner core 324 to function as described herein. Moreover, although the illustrated embodiments show each embodiment of interior portion 360 of hollow structure 320 configured to define inner core 324 as having complementary features 331 of a substantially identical repeating shape, it should be understood that this disclosure contemplates interior portion 360 of hollow structure 320 configured to define inner core 324 having any suitable combination of differently shaped complementary features 331 that enables inner core 324 to function as described herein.

With further reference to FIGS. 5-12, although the illustrated embodiments show inner core 324 as having a generally circular, ovoid, tapered, or rectangular cross-sectional perimeter, it should be understood that inner core 324 has any suitable additional or alternative cross-sectional perimeter that enables inner core 324 to function as described herein. Moreover, although the illustrated embodiments show each embodiment of inner core 324 as having a generally constant pattern of cross-sectional perimeter along its length, it should be understood that inner core 324 has any suitable variation in cross-sectional perimeter along its length that enables inner core 324 to function as described herein.

Figure 13:
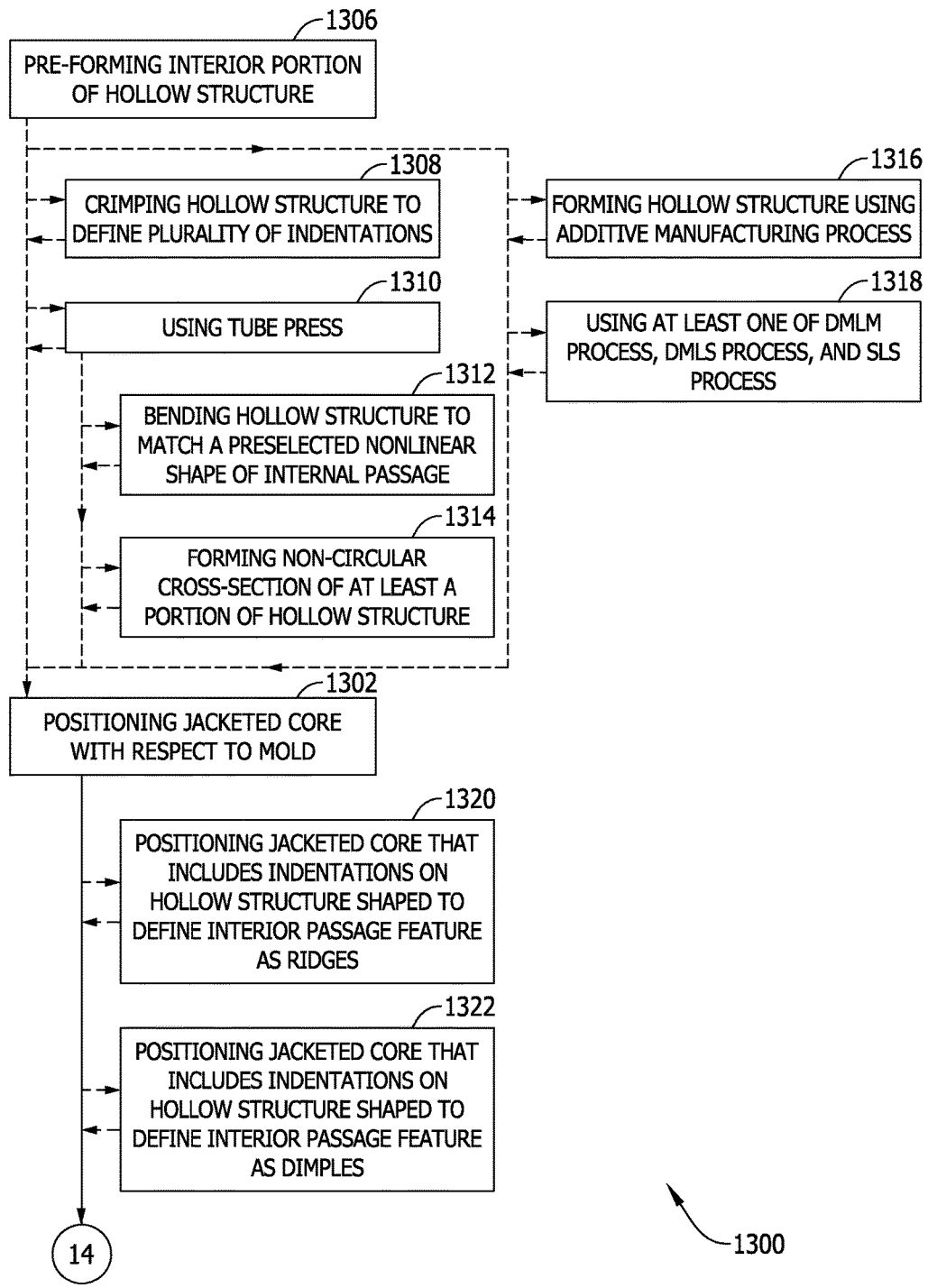
FIG. 13 is a flow diagram of an exemplary method of forming a component having an internal passage defined therein, such as a component for use with the rotary machine shown in FIG. 1.
Figure 14:
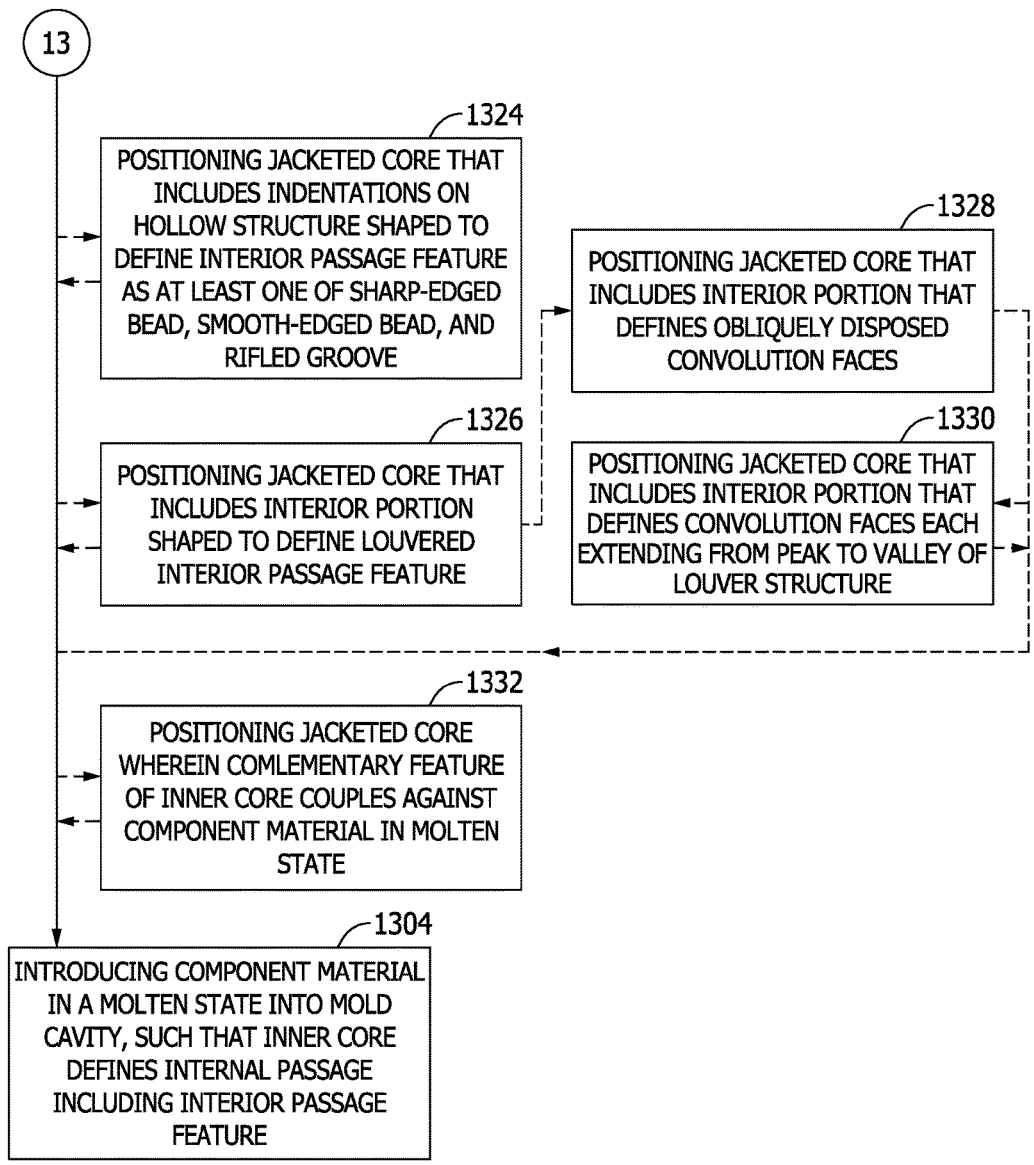
FIG. 14 is a continuation of the flow diagram from FIG. 13.

An exemplary method 1300 of forming a component, such as component 80, having an internal passage defined therein, such as internal passage 82, is illustrated in a flow diagram in FIGS. 13 and 14. With reference also to FIGS. 1-12, exemplary method 1300 includes positioning 1302 a jacketed core, such as jacketed core 310, with respect to a mold, such as mold 300. The mold defines a cavity therein, such as mold cavity 304. The jacketed core includes a hollow structure, such as hollow structure 320, that includes an interior portion, such as interior portion 360, shaped to define at least one interior passage feature of the internal passage, such as interior passage feature 98. The jacketed core also includes an inner core, such as inner core 324, disposed within the hollow structure and complementarily shaped by the interior portion of the hollow structure. Method 1300 also includes introducing 1304 a component material, such as component material 78, in a molten state into the cavity to form the component, such that the inner core defines the internal passage including the at least one interior passage feature defined therein.

In certain embodiments, method 1300 further includes, prior to disposing the inner core material within the hollow structure, pre-forming 1306 the interior portion of the hollow structure such that the interior portion is shaped to define a selected shape of the at least one interior passage feature. In some such embodiments, the step of pre-forming 1306 the interior portion of the hollow structure includes crimping 1308 the hollow structure at a plurality of locations to define a plurality of indentations, such as indentations 340. The indentations are shaped to define the at least one interior passage feature when the component is formed. Additionally or alternatively, the step of pre-forming 1306 the interior portion of the hollow structure includes using 1310 a suitable tube press. In some such embodiments, the step of using 1310 the tube press further includes bending 1312 the hollow structure to match a preselected nonlinear shape of the internal passage. Additionally or alternatively, the step of using 1310 the tube press further includes forming 1314 a non-circular cross-sectional perimeter of at least a portion of the hollow structure corresponding to a selected non-circular cross-sectional perimeter of at least a portion of the internal passage.

In some embodiments, the step of pre-forming 1306 the interior portion of the hollow structure includes forming 1316 the hollow structure using an additive manufacturing process. In some such embodiments, the step of forming 1316 the interior portion of the hollow structure includes using 1318 at least one of a direct metal laser melting (DMLM) process, a direct metal laser sintering (DMLS) process, and a selective laser sintering (SLS) process.

In certain embodiments, the step of positioning 1302 the jacketed core includes positioning 1320 the jacketed core that includes a plurality of indentations, such as indentations 340, defined on the hollow structure and shaped to define the at least one interior passage feature as a plurality of ridges, such as those defined by recessed features 334. Additionally or alternatively, the step of positioning 1302 the jacketed core includes positioning 1322 the jacketed core that includes a plurality of indentations, such as indentations 340, defined on the hollow structure and shaped to define the at least one interior passage feature as a plurality of dimples, such as dimples formed by dimple imprints 333. Additionally or alternatively, the step of positioning 1302 the jacketed core includes positioning 1324 the jacketed core that includes the interior portion of the hollow structure shaped to define the at least one interior passage feature as at least one of a sharp-edged bead, a smooth-edged bead, and a rifled groove, such as those defined respectively by sharp-edged bead structures 335, smooth-edged bead structures 337, and rifled groove structures 339.

In some embodiments, the step of positioning 1302 the jacketed core includes positioning 1326 the jacketed core that includes the interior portion of the hollow structure shaped to define the at least one interior passage feature as at least one louvered interior passage feature, such as one defined by louvered structure 371. In some such embodiments, the step of positioning 1302 the jacketed core includes positioning 1328 the jacketed core that includes the interior portion that defines a plurality of obliquely disposed convolution faces, such as convolution faces 372. Each convolution face includes a plurality of louvers, such as louvers 378. Moreover, in some such embodiments, the step of positioning 1302 the jacketed core includes positioning 1330 the jacketed core that includes the interior portion that defines each of the convolution faces extending from one of a plurality of peaks to one of a plurality of valleys of the louver structure, such as peaks 374 and valleys 376. The peaks and the valleys are defined on opposite sides of the hollow structure such that each of the peaks and the valleys lies proximate an outer wall, such as outer wall 380, of the hollow structure.

In certain embodiments, the step of positioning 1302 the jacketed core includes positioning 1332 the jacketed core that includes the interior portion of the hollow structure shaped to define at least one complementary feature of the inner core, such as the at least one complementary feature 331. The at least one complementary feature of the inner core couples against the component material in the molten state to shape the at least one interior passage feature.

The above-described jacketed core provides a cost-effective method for forming components that include internal passages defined therein with interior passage features, while reducing or eliminating fragility problems associated with the core. Specifically, the jacketed core includes the inner core, which is positioned within the mold cavity to define the position of the internal passage within the component, and also includes the hollow structure within which the inner core is disposed. The inner core is complementarily shaped by an interior portion of the hollow structure, such that the inner core defines at least one interior passage feature within the internal passage. In particular, but not by way of limitation, the jacketed core and methods described herein enable a reliable and repeatable formation of interior passage features at any location within internal passages having nonlinear and/or complex shapes and/or characterized by high L/d ratios. Also, specifically, the hollow structure is formed from a material that is at least partially absorbable by the molten component material introduced into the mold cavity to form the component. Thus, the use of the hollow structure does not interfere with the structural or performance characteristics of the component, and does not interfere with the later removal of the inner core material from the component to form the internal passage.

In addition, the jacketed core described herein provides a cost-effective and high-accuracy method to integrally form interior passage features of increased detail and/or complexity in the internal passage. Specifically, in some embodiments, the hollow structure reinforces the inner core, such that a risk of cracking of the inner core proximate stress concentrations associated with a complementary feature-forming geometry of the inner core is reduced. Additionally or alternatively, the ability to pre-shape the hollow structure to define the inner core facilitates adding complementary features to the inner core without machining the inner core, thus avoiding a risk of cracking or damaging the core.

An exemplary technical effect of the methods, systems, and apparatus described herein includes at least one of: (a) reducing or eliminating fragility problems associated with forming, handling, transport, and/or storage of the core used in forming a component having an internal passage defined therein, the internal passage having interior passage features; (b) an ability to reliably and repeatably form interior passage features at any location within internal passages, even those having nonlinear and/or complex shapes and/or characterized by high L/d ratios; and (c) reducing or eliminating fragility problems associated with features of the core that complementarily define interior passage features in the component.

Exemplary embodiments of jacketed cores are described above in detail. The jacketed cores, and methods and systems using such jacketed cores, are not limited to the specific embodiments described herein, but rather, components of systems and/or steps of the methods may be utilized independently and separately from other components and/or steps described herein. For example, the exemplary embodiments can be implemented and utilized in connection with many other applications that are currently configured to use cores within mold assemblies.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of forming a component having an internal passage defined therein, said method comprising:
   positioning a jacketed core with respect to a mold, wherein the jacketed core includes:
      a hollow structure formed from a first material that extends from an interior portion of the hollow structure to substantially an entire outer perimeter of the hollow structure, wherein the interior portion is shaped to define at least one interior passage feature of the internal passage, and wherein the first material is metallic; and
      an inner core disposed within the hollow structure and complementarily shaped by the interior portion of the hollow structure;
   introducing a component material in a molten state into a cavity of the mold, such that a portion of the jacketed core is submerged, and such that the component material in the molten state contacts the first material along substantially the entire outer perimeter of the submerged portion of the jacketed core to form the component, such that the inner core defines the internal passage including the at least one interior passage feature defined therein;
   cooling the component material in the cavity to form the component; and
   removing the inner core from the component to form the internal passage.

2. The method of claim 1, further comprising, prior to disposing an inner core material within the hollow structure, pre-forming the interior portion of the hollow structure such that the interior portion is shaped to define a selected shape of the at least one interior passage feature.

3. The method of claim 2, wherein said pre-forming the interior portion of the hollow structure comprises crimping the hollow structure at a plurality of locations to define a plurality of indentations, the indentations shaped to define the at least one interior passage feature when the component is formed.

4. The method of claim 2, wherein said pre-forming the interior portion of the hollow structure comprises using a tube press.

5. The method of claim 4, wherein said using the tube press further comprises bending the hollow structure to match a preselected nonlinear shape of the internal passage.

6. The method of claim 4, wherein said using the tube press further comprises forming a non-circular cross-sectional perimeter of at least a portion of the hollow structure corresponding to a selected non-circular cross-sectional perimeter of at least a portion of the internal passage.

7. The method of claim 2, wherein said pre-forming the interior portion of the hollow structure comprises forming the hollow structure using an additive manufacturing process.

8. The method of claim 7, wherein said forming the hollow structure comprises using at least one of a direct metal laser melting (DMLM) process, a direct metal laser sintering (DMLS) process, and a selective laser sintering (SLS) process.

9. The method of claim 1, wherein said positioning the jacketed core comprises positioning the jacketed core that includes a plurality of indentations defined on the hollow structure, the indentations shaped to define the at least one interior passage feature as a plurality of ridges.

10. The method of claim 1, wherein said positioning the jacketed core comprises positioning the jacketed core that includes a plurality of indentations defined on the hollow structure, the indentations shaped to define the at least one interior passage feature as a plurality of dimples.

11. The method of claim 1, wherein said positioning the jacketed core comprises positioning the jacketed core including the interior portion of the hollow structure shaped to define the at least one interior passage feature as at least one of a sharp-edged bead, a smooth-edged bead, and a rifled groove.

12. The method of claim 1, wherein said positioning the jacketed core comprises positioning the jacketed core including the interior portion of the hollow structure shaped to define the at least one interior passage feature as at least one louvered interior passage feature.

13. The method of claim 12, wherein said positioning the jacketed core comprises positioning the jacketed core including the interior portion that defines a plurality of obliquely disposed convolution faces, wherein each convolution face includes a plurality of louvers.

14. The method of claim 13, wherein said positioning the jacketed core comprises positioning the jacketed core including the interior portion that defines each of the convolution faces extending from one of a plurality of peaks to one of a plurality of valleys of the louver structure, the peaks and the valleys defined on opposite sides of the hollow structure such that each of the peaks and the valleys lies proximate the outer perimeter of the hollow structure.

15. The method of claim 1, wherein said positioning the jacketed core comprises positioning the jacketed core including the interior portion of the hollow structure shaped to define at least one complementary feature of the inner core, wherein the component material in the molten state couples against the at least one complementary feature of the inner core to shape the at least one interior passage feature.

* * * * *